United States Patent
Mizobata

[11] Patent Number: 5,977,946
[45] Date of Patent: Nov. 2, 1999

[54] MULTI-WINDOW APPARATUS

[75] Inventor: Norihiko Mizobata, Osaka, Japan

[73] Assignee: Matsushita Electric Industrial Co., Ltd., Osaka, Japan

[21] Appl. No.: 08/783,910

[22] Filed: Jan. 16, 1997

Related U.S. Application Data

[63] Continuation of application No. 08/358,608, Dec. 14, 1994, abandoned.

[30] Foreign Application Priority Data

Dec. 16, 1993 [JP] Japan .................................. 5-316290

[51] Int. Cl.$^6$ ..................................................... H04N 7/08
[52] U.S. Cl. .......................... 345/112; 345/147; 345/150; 345/431; 345/432; 348/576
[58] Field of Search ..................... 345/112, 113, 345/114, 147, 150, 153, 155, 431, 432; 348/576

[56] References Cited

U.S. PATENT DOCUMENTS

| | | | |
|---|---|---|---|
| 3,961,133 | 6/1976 | Bennett | 348/586 |
| 4,053,931 | 10/1977 | Hawkins et al. | 358/134 |
| 4,149,184 | 4/1979 | Giddings et al. | 358/81 |
| 4,231,065 | 10/1980 | Fitch et al. | 358/166 |
| 4,498,098 | 2/1985 | Stell | 358/22 |
| 4,509,043 | 4/1985 | Mossaides | 345/113 |
| 4,591,842 | 5/1986 | Clarke, Jr. et al. | 345/114 |
| 4,613,906 | 9/1986 | Tanaka et al. | 348/239 |
| 4,626,835 | 12/1986 | Nienaber et al. | 340/703 |
| 4,694,329 | 9/1987 | Belmares-Sarabia et al. | 348/586 |
| 4,818,979 | 4/1989 | Manson | |
| 4,857,899 | 8/1989 | Ishii | 340/701 |
| 4,942,391 | 7/1990 | Kikuta | 345/113 |
| 4,975,861 | 12/1990 | Fujimoto | 364/521 |
| 5,151,954 | 9/1992 | Takai et al. | 382/41 |
| 5,218,432 | 6/1993 | Wakeland | 348/590 |
| 5,289,566 | 2/1994 | Walker et al. | 345/432 |
| 5,315,695 | 5/1994 | Saito et al. | 395/132 |
| 5,430,838 | 7/1995 | Kuno et al. | 395/157 |
| 5,579,028 | 11/1996 | Takeya | 345/115 |
| 5,594,467 | 1/1997 | Marlton et al. | 345/115 |

FOREIGN PATENT DOCUMENTS

| | | | |
|---|---|---|---|
| 60-209786 | 10/1985 | Japan . | |
| 62-136695 | 6/1987 | Japan . | |
| 3282586 | 12/1991 | Japan | G09G 5/14 |
| 3-282586 | 12/1991 | Japan . | |
| 92-16029 | 8/1992 | Rep. of Korea . | |

*Primary Examiner*—Bipin H. Shalwala
*Assistant Examiner*—Vincent E. Kovalick
*Attorney, Agent, or Firm*—McDermott, Will & Emery

[57] ABSTRACT

A video memory stores a plurality of image data, and an attribute storage means stores image attributes indicating whether or not the respective image data require expansion of a luminance range. An image data conversion means receives an image data digital signal output from the video memory and an image attribute signal output from the attribute storage means. When the image attribute signal provides an instruction to expand the luminance range, the image data conversion means outputs, to a display unit, a display data analog signal representing a higher luminance value, as compared with the display data analog signal to be output therefrom when the image attribute signal provides no instruction to expand the luminance range.

32 Claims, 23 Drawing Sheets

21: COLOR CONVERSION MEANS
24: D/A CONVERSION MEANS
71: AMPLIFYING MEANS

MULTI-WINDOW APPARATUS

This is a continuation application of application Ser. No. 08/358,608, filed Dec. 14, 1994, now abandoned.

BACKGROUND OF THE INVENTION

The present invention relates to a multi-window apparatus for displaying a motion video image, a photograph, a character image and the like on the same screen. More particularly, the invention relates to a multi-window apparatus in which a window for displaying a motion video image or a photograph is provided with an expanded range of display luminance to obtain a very realistic image, and a window for displaying a character image or the like displays an image easy to see.

A multi-window apparatus is an apparatus for displaying a plurality of images on a single screen.

FIG. 21 shows a specific example of the configuration of such a multi-window apparatus. The reference numeral 201 denotes a central processing unit, 202 a main memory, 203 a graphics control means, 204 a video memory, 205 an image data conversion means, and 206 a display unit.

The central processing unit 201 reads a program from the main memory 202 and executes it, thereby giving instructions to the graphics control means 203 for the input/output of image data, controlling the image data conversion means 205, and also controlling other operations.

The main memory 202 stores programs to be executed by the central processing unit 201 and also stores image data. A plurality of image data are stored in the video memory 204 which outputs the image data as an image data digital signal 20a.

The graphics control means 203 receives instructions for the input/output of image data from the central processing unit 201, thereby controlling the video memory 204.

In the image data conversion means 205, the image data digital signal 20a output from the video memory 204 is subjected to color conversion and is also converted into a data form suitable for the display unit 206. The details of these conversion processes are set by the central processing unit 201.

FIG. 22 shows the configuration of the above-mentioned image data conversion means 205. The image data conversion means 205 consists of a color conversion means 211 and a D/A conversion means 212. The color conversion means 211 receives the image data digital signal 20a and performs color conversion of the image data, thereby outputting a color-converted image data digital signal 21a. The D/A conversion means 212 receives the color-converted image data digital signal 21a and converts it from digital to analog form, thereby outputting a display data analog signal 20b.

It is herein assumed that the image data digital signal 20a input to the image data conversion means 205 carries three sets of 8-bit data (24 bits in total), each representing one of the three primary colors: red (hereinafter referred to as "R"), green ("G") and blue ("B").

The color conversion means 211 has a color-correspondence table for each of the colors R, G and B, containing data on the color conversion of each color. Each color-correspondence table has 256 ($=2^8$) entries. In each entry, color data to be obtained after color conversion is set. In accordance with the three sets of data respectively representing R, G and B in the input image data digital signal 20a, three sets of color data to be obtained after color conversion are respectively read out from the entries of the three color-correspondence tables, and then output as the color-converted image data digital signal 21a. The contents of the color-correspondence tables are set in accordance with a table update signal 20c sent from the central processing unit 201.

There is also a multi-window apparatus in which a color conversion means has a plurality of color-correspondence tables for each color, so that display images in different windows are allowed to have different color tones (Japanese Laid-open Patent Publication Nos. 60-209786 and 62-136695).

The D/A conversion means 212 converts the color-converted image data digital signal 21a from digital to analog form, and outputs the result of the conversion as the display data analog signal 20b.

An image is displayed as follows: In accordance with an instruction given by the central processing unit 201, image data are input to the video memory 204 by the graphics control means 203. The image data stored in the video memory 204 are read out as the image data digital signal 20a under the control of the graphics control means 203, and then input to the image data conversion means 205. In the image data conversion means 205, the image data digital signal 20a is subjected to data conversion, and then output as the display data analog signal 20b to the display unit 206, where the image is displayed accordingly.

A conventional multi-window apparatus such as described above, however, involves the following problem.

Since the image data digital signal carries three sets of 8-bit data respectively representing R, G and B, the luminance of each color is represented by a value of 0 to 255 ($=2^8-1$). The value "0" represents the lowest luminance value, while "255" represents the highest luminance value.

FIG. 23 shows the pixel distribution with respect to luminance in each set of image data. The solid line indicates the pixel distribution of an image which is produced by using a camera (hereinafter referred to as a "camera image"). The broken line indicates the pixel distribution of an image which is produced by computer (hereinafter referred to as a "CG image"). Camera images include photographs of landscapes or people, motion video images, and the like. CG images include character images, images created by so-called computer graphics, and the like.

For example, in the case of a character image, for the purpose of making the image easy to see, high contrast between characters and the background is often provided by, for example, allowing black characters to be displayed on the white background. Thus, in the pixel distribution with respect to luminance in the character image, a large number of pixels are concentrated in the vicinity of the highest luminance value (255) and in the vicinity of the lowest luminance value (0), as shown by the broken line of FIG. 23. On the other hand, in the case of a camera image, objects with various levels of brightness are used as the image data to be displayed. Accordingly, in the pixel distribution of the camera image, a large number of pixels are concentrated at intermediate luminance values, as shown by the solid line of FIG. 23.

In cases where such camera and CG images as described above are displayed on the same screen, the camera image becomes relatively dark if the brightness of the screen is set so as to make the CG image easy to see. Conversely, if the brightness of the entire monitor screen is increased to make the camera image easy to see, the contrast of the CG image becomes too high, which makes the CG image too bright and accordingly makes it difficult to see. The reason for this is that the CG image and the camera image require different levels of screen brightness in order to be clearly seen by the human eye. The optimum screen brightness for the camera image is of such a level that the pixels with the intermediate luminance values are allowed to be clearly seen. On the other hand, the optimum screen brightness for the CG image which is suitable for the human eye is of such a level that the pixels with luminance values in the vicinity of the highest luminance value (255) are not too bright and can be seen clearly.

As described above, in the conventional multi-window apparatus, when a camera image and a CG image are displayed on the same screen, it is impossible to obtain both the optimum levels of screen brightness which allow the camera and CG images to be easily seen. Most users adjust the brightness of the monitor in accordance with the luminance of the characters. This causes a defect in the conventional multi-window apparatus; the camera image becomes dark and difficult to see.

SUMMARY OF THE INVENTION

The present invention, which solves the above-described problem in the prior art, has been accomplished with the objectives of: providing an image data conversion apparatus which previously converts the luminance of each set of image data into such a luminance value as to make the image easier to see, and outputs the thus converted image data to the monitor screen; and providing a multi-window apparatus which utilizes such an image data conversion apparatus.

A multi-window apparatus according to the present invention comprises: an image combining means for combining a plurality of images; and a display unit for displaying, on a screen, an image which is obtained through combining of the images by the image combining means. The image combining means distinguishes a first image from a second image, and expands a luminance range of only the first image, and then combining the first and second images, the first image requiring expansion of its luminance range, and the second image requiring no expansion of its luminance range.

In the above-described multi-window apparatus, the image which requires a wide range of luminance can be displayed after its luminance range has been expanded, while the image which should be displayed with an ordinary luminance range can be displayed without expansion of its luminance range. Therefore, all the windows can display images which are neither too dark nor too bright and can thus be quite easily seen by the human eye.

Preferably, in the above-described multi-window apparatus, the first image is an image produced by using a camera, and the second image is an image produced by computer.

Accordingly, an image such as a still image of a landscape or the like or a motion video image, which requires a wide range of luminance, can be displayed after its luminance range has been expanded, while an image such as a character image, which should be displayed with an ordinary luminance range, can be displayed without expansion of its luminance range. Therefore, all the windows can display images which are neither too dark nor too bright and can thus be quite easily seen by the human eye.

Preferably, in the above-described multi-window apparatus, the image combining means comprises: a video memory which has a plurality of storage areas for respectively storing a plurality of image data, and outputs, as an image data digital signal, the image data stored in the respective storage areas; an attribute storage means for storing, as an image attribute corresponding to each of the storage areas, information on whether expansion of a luminance range is required or not, and for outputting an image attribute signal which provides an instruction to expand the luminance range when the image attribute indicates that the expansion of the luminance range is required, or provides no instruction to expand the luminance range when the image attribute indicates that the expansion of the luminance range is not required; and an image data conversion means which receives the image data digital signal output from the video memory and the image attribute signal output from the attribute storage means, and generates a display data analog signal for allowing the display unit to display the image, and then outputs the thus generated signal to the display unit, the image data conversion means increasing a luminance value represented by the display data analog signal only when the image attribute signal provides the instruction to expand the luminance range.

With the configuration described above, the image data input to the image combining means are stored in the video memory, and the information on whether the expansion of the luminance range is required or not is stored as the image attribute in the attribute storage means. The video memory outputs the image data digital signal. The attribute storage means outputs the image attribute signal. The image data digital signal and the image attribute signal are input to the image data conversion means. On the basis of these two input signals, the image data conversion means generates the display data analog signal for allowing the image to be displayed, and then outputs the thus generated signal to the display unit. At this time, the image data conversion means increases the luminance value represented by the display data analog signal only when the image attribute signal provides the instruction to expand the luminance range. Thus, the display data analog signal carrying the image data the luminance range of which is required to be expanded represents a higher luminance value, as compared with the display data analog signal carrying the image data the luminance range of which is not required to be expanded. As a result, the combined image can be displayed on a single screen in such a manner that the images constituting the entire display image have their respective optimum levels of brightness which allow them to be most easily seen by the human eye.

Preferably, in the above-described multi-window apparatus comprising the video memory, the attribute storage means and the image data conversion means, the image data conversion means comprises: a luminance conversion means which performs luminance conversion on the image data digital signal input thereto so as to expand the luminance range, and outputs the result of the conversion as a luminance-converted image data digital signal; a data selection means which receives the image data digital signal, the luminance-converted image data digital signal and the image attribute signal, and selects the luminance-converted image data digital signal when the image attribute signal provides the instruction to expand the luminance range, or selects the image data digital signal when the image attribute signal provides no instruction to expand the luminance range, and then outputs the thus selected signal; and a D/A conversion means which converts, from digital to analog form, the image data digital signal or luminance-converted image data digital signal output from the data selection means, and outputs the result of the conversion as the display data analog signal.

With the configuration described above, the image data digital signal input to the image data conversion means is subjected to luminance conversion for the expansion of the luminance range in the luminance conversion means, and the resultant signal is output as the luminance-converted image data digital signal. The image data digital signal, the luminance-converted image data digital signal and the image attribute signal are input to the data selection means. In the data selection means, the luminance-converted image data digital signal is selected and output when the image attribute signal provides the instruction to expand the luminance range, while the image data digital signal is selected and output when the image attribute signal provides no instruction to expand the luminance range. The thus output image data digital signal or luminance-converted image data digital signal is converted from digital to analog form in the D/A conversion means, and is accordingly output as the display data analog signal. In the image data conversion means, therefore, the luminance value represented by the display data analog signal can be increased only when the image attribute signal provides the instruction to expand the luminance range.

Alternatively, in the above-described multi-window apparatus comprising the video memory, the attribute storage means and the image data conversion means, the image data conversion means may comprise: a first color conversion means which performs color conversion on the image data digital signal input thereto, and outputs the result of the conversion as a first color-converted image data digital signal; a second color conversion means which performs color conversion on the image data digital signal input thereto and also performs luminance conversion on it so as to expand the luminance range, and then outputs the results of the conversion as a second color-converted image data digital signal; a data selection means which receives the first color-converted image data digital signal, the second color-converted image data digital signal and the image attribute signal, and selects the second color-converted image data digital signal when the image attribute signal provides the instruction to expand the luminance range, or selects the first color-converted image data digital signal when the image attribute signal provides no instruction to expand the luminance range, and then outputs the thus selected signal; and a D/A conversion means which converts, from digital to analog form, the first or second color-converted image data digital signal output from the data selection means, and outputs the result of the conversion as the display data analog signal.

With the configuration described above, the image data digital signal input to the image data conversion means is subjected to color conversion in the first color conversion means, and is accordingly output as the first color-converted image data digital signal. In the second color conversion means, the image data digital signal is subjected to color conversion and is also subjected to luminance conversion so that the luminance range is expanded, and the resultant signal is output as the second color-converted image data digital signal. The first and second color-converted image data digital signals and the image attribute signal are input to the data selection means. In the data selection means, the second color-converted image data digital signal is selected and output when the image attribute signal provides the instruction to expand the luminance range, while the first color-converted image data digital signal is selected and output when the image attribute signal provides no instruction to expand the luminance range. The thus output first or second color-converted image data digital signal is converted from digital to analog form in the D/A conversion means, and is accordingly output as the display data analog signal. In the image data conversion means, therefore, the luminance value represented by the display data analog signal can be increased only when the image attribute signal provides the instruction to expand the luminance range.

Alternatively, in the above-described multi-window apparatus comprising the video memory, the attribute storage means and the image data conversion means, the image data conversion means may comprise: a first D/A conversion means which converts the image data digital signal input thereto from digital to analog form, and outputs the result of the conversion as a first image data analog signal; a second D/A conversion means which converts the image data digital signal input thereto from digital to analog form at a higher maximum output signal level as compared with the first D/A conversion means, and outputs the result of the conversion as a second image data analog signal; and a data selection means which receives the first image data analog signal, the second image data analog signal and the image attribute signal, and selects the second image data analog signal when the image attribute signal provides the instruction to expand the luminance range, or selects the first image data analog signal when the image attribute signal provides no instruction to expand the luminance range, and then outputs the thus selected signal as the display data analog signal.

With the configuration described above, the image data digital signal input to the image data conversion means is converted from digital to analog form in the first D/A conversion means, and is accordingly output as the first image data analog signal. In the second D/A conversion means, the image data digital signal is converted from digital to analog form at a higher maximum output signal level as compared with the first D/A conversion means, and is accordingly output as the second image data analog signal. The first and second image data analog signals and the image attribute signal are input to the data selection means. In the data selection means, the second image data analog signal is selected when the image attribute signal provides the instruction to expand the luminance range, while the first image data analog signal is selected when the image attribute signal provides no instruction to expand the luminance range. The thus selected signal is output as the display data analog signal. In the image data conversion means, therefore, the luminance value represented by the display data analog signal can be increased only when the image attribute signal provides the instruction to expand the luminance range.

Alternatively, in the above-described multi-window apparatus comprising the video memory, the attribute storage means and the image data conversion means, the image data conversion means may comprise: a D/A conversion means which converts the image data digital signal input thereto from digital to analog form, and outputs the result of the conversion as an image data analog signal; and an amplifying means which receives the image data analog signal and the image attribute signal, and amplifies the received image data analog signal by a relatively high amplification factor when the image attribute signal provides the instruction to expand the luminance range, or amplifies the received image data analog signal by a relatively low amplification factor when the image attribute signal provides no instruction to expand the luminance range, and then outputs the result of the amplification as the display data analog signal.

With the configuration described above, the image data digital signal input to the image data conversion means is converted from digital to analog form in the D/A conversion means, and is accordingly output as the image data analog signal. The image data analog signal and the image attribute signal are input to the amplifying means. In the amplifying means, the image data analog signal is amplified by a relatively high amplification factor when the image attribute signal provides the instruction to expand the luminance range, while it is amplified by a relatively low amplification factor when the image attribute signal provides no instruction to expand the luminance range. The result of the amplification is output as the display data analog signal. In the image data conversion means, therefore, the luminance value represented by the display data analog signal can be increased only when the image attribute signal provides the instruction to expand the luminance range.

Alternatively, in the above-described multi-window apparatus comprising the video memory, the attribute storage means and the image data conversion means, the attribute storage means may store, as the image attribute corresponding to each of the storage areas, a rate of expansion of the luminance range as well as the information on whether the expansion of the luminance range is required or not, and output an image attribute signal which not only provides the instruction to expand the luminance range but also indicates the rate of expansion of the luminance range when the image attribute indicates that the expansion of the luminance range is required, or provides no instruction to expand the luminance range when the image attribute indicates that the expansion of the luminance range is not required, and the image data conversion means may comprise: a plurality of luminance conversion means which perform luminance conversion on the image data digital signal input thereto so as to expand the luminance range, and output their respective results of the conversion as luminance-converted image data digital signals; a data selection means which receives the image data digital signal, the luminance-converted image data digital signals and the image attribute signal, and selects one digital signal from among the image data digital signal and the luminance-converted image data digital signals in accordance with the image attribute signal; and a D/A conversion means which converts, from digital to analog form, the digital signal selected by the data selection means, and outputs the result of the conversion as the display data analog signal.

With the configuration described above, the image data digital signal input to the image data conversion means is subjected to luminance conversion for the expansion of the luminance range in the above-mentioned two or more luminance conversion means provided with different rates of expansion of the luminance range, and accordingly, the respective resultant signals are output as the luminance-converted image data digital signals. The image data digital signal, the luminance-converted image data digital signals and the image attribute signal are input to the data selection means, where one digital signal is selected from among the image data digital signal and luminance-converted image data digital signals in accordance with the image attribute signal. The thus selected digital signal is converted from digital to analog form in the DhA conversion means, and is accordingly output as the display data analog signal. In the image data conversion means, therefore, the luminance value represented by the display data analog signal can be increased in accordance with the given rate of expansion of the luminance range only when the image attribute signal provides the instruction to expand the luminance range.

Alternatively, in the above-described multi-window apparatus comprising the video memory, the attribute storage means and the image data conversion means, the attribute storage means may store, as the image attribute corresponding to each of the storage areas, a rate of expansion of the luminance range as well as the information on whether the expansion of the luminance range is required or not, and output an image attribute signal which not only provides the instruction to expand the luminance range but also indicates the rate of expansion of the luminance range when the image attribute indicates that the expansion of the luminance range is required, or provides no instruction to expand the luminance range when the image attribute indicates that the expansion of the luminance range is not required, and the image data conversion means may comprise: a plurality of D/A conversion means which convert the image data digital signal input thereto from digital to analog form at different maximum output signal levels, and output their respective results of the conversion as image data analog signals; and a data selection means which receives the image data analog signals and the image attribute signal, and selects one analog signal from among the image data analog signals in accordance with the image attribute signal, and then outputs the thus selected analog signal as the display data analog signal.

With the configuration described above, the image data digital signal input to the image data conversion means is converted from digital to analog form at different maximum output levels respectively in the above-mentioned two or more D/A conversion means, and accordingly, the respective resultant signals are output as the image data analog signals. The image data analog signals and the image attribute signal are input to the data selection means, where one analog signal is selected from among these image data analog signals in accordance with the image attribute signal. The thus selected analog signal is output as the display data analog signal. In the image data conversion means, therefore, the luminance value represented by the display data analog signal can be increased in accordance with the given rate of expansion of the luminance range only when the image attribute signal provides the instruction to expand the luminance range.

In the above-described multi-window apparatus, the image combining means may comprise: a main memory which has a plurality of storage areas for respectively storing a plurality of image data, and outputs, as a non-luminance-adjusted image data digital signal, the image data stored in the respective storage areas; an attribute storage means for storing, as an image attribute corresponding to each of the storage areas, information on whether expansion of a luminance range is required or not, and for outputting an image attribute signal which provides an instruction to expand the luminance range when the image attribute indicates that the expansion of the luminance range is required, or provides no instruction to expand the luminance range when the image attribute indicates that the expansion of the luminance range is not required; a first image data conversion means which receives the non-luminance-adjusted image data digital signal output from the main memory and the image attribute signal output from the attribute storage means, and outputs a luminance-adjusted image data digital signal, the first image data conversion means increasing a luminance value represented by the luminance-adjusted image data digital signal only when the image attribute signal provides the instruction to expand the luminance range; a video memory which first stores, in the form of image data, the luminance-adjusted image data digital signal output from the first image data conversion means, and then outputs the stored image data as an image data digital signal; and a second image data conversion means which receives the image data digital signal output from the video memory, and generates and outputs a display data analog signal.

With the configuration described above, the image data input to the image combining means are stored in the main memory, and the information on whether the expansion of the luminance range is required or not is stored as the image attribute in the attribute storage means. The main memory outputs the non-luminance-adjusted image data digital signal. The attribute storage means outputs the image attribute signal. The non-luminance-adjusted image data digital signal and the image attribute signal are input to the first image data conversion means, which generates the luminance-adjusted image data digital signal on the basis of these two input signals, and then outputs the thus generated signal. At this time, the first image data conversion means increases the luminance value represented by the luminance-adjusted image data digital signal only when the image attribute signal provides the instruction to expand the luminance range. The output luminance-adjusted image data digital signal is input to the video memory and is first stored therein as image data. The image data are output as the image data digital signal again from the video memory to the second image data conversion means, which then converts the image data digital signal into the display data analog signal and outputs it. Thus, the display data analog signal carrying the image data the luminance range of which is required to be expanded represents a higher luminance value, as compared with the display data analog signal carrying the image data the luminance range of which is not required to be expanded. As a result, the combined image can be displayed on a single screen in such a manner that the images constituting the entire display image have their respective optimum levels of brightness which allow them to be most easily seen by the human eye.

Preferably, in the above-described multi-window apparatus comprising the main memory, the first image data conversion means, the attribute storage means, the second image data conversion means and the video memory, the first image data conversion means comprises: a luminance conversion means which performs luminance conversion on the non-luminance-adjusted image data digital signal input thereto so as to expand the luminance range, and outputs the result of the conversion as a luminance-converted image data digital signal; and a data selection means which receives the non-luminance-adjusted image data digital signal, the luminance-converted image data digital signal and the image attribute signal, and selects the luminance-converted image data digital signal when the image attribute signal provides the instruction to expand the luminance range, or selects the non-luminance-adjusted image data digital signal when the image attribute signal provides no instruction to expand the luminance range, and then outputs the thus selected signal as the luminance-adjusted image data digital signal.

With the configuration described above, the non-luminance-adjusted image data digital signal input to the first image data conversion means is subjected to luminance conversion for the expansion of the luminance range in the luminance conversion means, and the resultant signal is output as the luminance-converted image data digital signal. The non-luminance-adjusted image data digital signal, the luminance-converted image data digital signal and the image attribute signal are input to the data selection means. In the data selection means, the luminance-converted image data digital signal is selected when the image attribute signal provides the instruction to expand the luminance range, while the non-luminance-adjusted image data digital signal is selected when the image attribute signal provides no instruction to expand the luminance range. The thus selected digital signal is output as the luminance-adjusted image data digital signal. In the first image data conversion means, therefore, the luminance value represented by the luminance-adjusted image data digital signal can be increased only when the image attribute signal provides the instruction to expand the luminance range.

Alternatively, in the above-described multi-window apparatus comprising the main memory, the first image data conversion means, the attribute storage means, the second image data conversion means and the video memory, the first image data conversion means may comprise: a first color conversion means which performs color conversion on the non-luminance-adjusted image data digital signal input thereto, and outputs the result of the conversion as a first color-converted image data digital signal; a second color conversion means which performs color conversion on the non-luminance-adjusted image data digital signal input thereto and also performs luminance conversion on it so as to expand the luminance range, and then outputs the results of the conversion as a second color-converted image data digital signal; and a data selection means which receives the first color-converted image data digital signal, the second color-converted image data digital signal and the image attribute signal, and selects the second color-converted image data digital signal when the image attribute signal provides the instruction to expand the luminance range, or selects the first color-converted image data digital signal when the image attribute signal provides no instruction to expand the luminance range, and then outputs the thus selected signal as the luminance-adjusted image data digital signal.

With the configuration described above, the non-luminance-adjusted image data digital signal input to the first image data conversion means is subjected to color conversion in the first color conversion means, and is accordingly output as the first color-converted image data digital signal. In the second color conversion means, the non-luminance-adjusted image data digital signal is subjected to color conversion and is also subjected to luminance conversion so that the luminance range is expanded, and the resultant signal is output as the second color-converted image data digital signal. The first and second color-converted image data digital signals and the image attribute signal are input to the data selection means. In the data selection means, the second color-converted image data digital signal is selected when the image attribute signal provides the instruction to expand the luminance range, while the first color-converted image data digital signal is selected when the image attribute signal provides no instruction to expand the luminance range. The thus selected digital signal is output as the luminance-adjusted image data digital signal. In the first image data conversion means, therefore, the luminance value represented by the luminance-adjusted image data digital signal can be increased only when the image attribute signal provides the instruction to expand the luminance range.

Alternatively, in the above-described multi-window apparatus comprising the main memory, the first image data conversion means, the attribute storage means, the second image data conversion means and the video memory, the attribute storage means may store, as the image attribute corresponding to each of the storage areas, a rate of expansion of the luminance range as well as the information on whether the expansion of the luminance range is required or not, and output an image attribute signal which not only provides the instruction to expand the luminance range but also indicates the rate of expansion of the luminance range when the image attribute indicates that the expansion of the luminance range is required, or provides no instruction to expand the luminance range when the image attribute indicates that the expansion of the luminance range is not required, and the first image data conversion means may comprise: a plurality of luminance conversion means which perform luminance conversion on the non-luminance-adjusted image data digital signal input thereto so as to expand the luminance range, and output their respective results of the conversion as luminance-converted image data digital signals; and a data selection means which receives the non-luminance-adjusted image data digital signal, the luminance-converted image data digital signals and the image attribute signal, and selects one digital signal from among the non-luminance-adjusted image data digital signal and the luminance-converted image data digital signals in accordance with the image attribute signal, and then outputs the thus selected digital signal as the luminance-adjusted image data digital signal.

With the configuration described above, the non-luminance-adjusted image data digital signal input to the first image data conversion means is subjected to luminance conversion for the expansion of the luminance range in the above-mentioned two or more luminance conversion means provided with different rates of expansion of the luminance range, and accordingly, the respective resultant signals are output as the luminance-converted image data digital signals. The non-luminance-adjusted image data digital signal, the luminance-converted image data digital signals and the image attribute signal are input to the data selection means, in which one digital signal is selected from among the non-luminance-adjusted image data digital signal and luminance-converted image data digital signals in accordance with the image attribute signal. The thus selected digital signal is output as the luminance-adjusted image data digital signal. In the first image data conversion means, therefore, the luminance value represented by the luminance-adjusted image data digital signal can be increased in accordance with the given rate of expansion of the luminance range only when the image attribute signal provides the instruction to expand the luminance range.

A first image data conversion apparatus according to the present invention receives an image data digital signal output from a video memory having a plurality of storage areas where a plurality of image data are respectively stored, and also receives an image attribute signal output from an attribute storage means where information on whether expansion of a luminance range is required or not is stored as an image attribute corresponding to each of the storage areas. The image attribute signal provides an instruction to expand the luminance range when the image attribute indicates that the expansion of the luminance range is required, or provides no instruction to expand the luminance range when the image attribute indicates that the expansion of the luminance range is not required. On receiving the image data digital signal and the image attribute signal, the first image data conversion apparatus generates a display data analog signal which allows a display unit to display an image, and then outputs the thus generated signal to the display unit. In generating the display data analog signal, the first image data conversion apparatus increases the luminance value represented by the display data analog signal only when the received image attribute signal provides the instruction to expand the luminance range.

In the above-described first image data conversion apparatus, at the time when the image data digital signal is converted into the display data analog signal, the luminance value represented by the display data analog signal is increased only in the case where the received image attribute signal provides the instruction to expand the luminance range. Thus, the display data analog signal carrying the image data the luminance range of which is required to be expanded represents a higher luminance value, as compared with the display data analog signal carrying the image data the luminance range of which is not required to be expanded. As a result, in a multi-window apparatus utilizing this first image data conversion apparatus, the combined image can be displayed on a single screen in such a manner that the images constituting the entire display image have their respective optimum levels of brightness which allow them to be most easily seen by the human eye.

Preferably, the above-described first image data conversion apparatus comprises: a luminance conversion means which performs luminance conversion on the image data digital signal input thereto so as to expand the luminance range, and outputs the result of the conversion as a luminance-converted image data digital signal; a data selection means which receives the image data digital signal, the luminance-converted image data digital signal and the image attribute signal, and selects the luminance-converted image data digital signal when the image attribute signal provides the instruction to expand the luminance range, or selects the image data digital signal when the image attribute signal provides no instruction to expand the luminance range, and then outputs the thus selected signal; and a D/A conversion means which converts, from digital to analog form, the image data digital signal or luminance-converted image data digital signal output from the data selection means, and outputs the result of the conversion as the display data analog signal.

With the configuration described above, the image data digital signal input to the first image data conversion apparatus is first subjected to luminance conversion for the expansion of the luminance range in the luminance conversion means, and the resultant signal is output as the luminance-converted image data digital signal. The image data digital signal, the luminance-converted image data digital signal and the image attribute signal are input to the data selection means. In the data selection means, the luminance-converted image data digital signal is selected and output when the image attribute signal provides the instruction to expand the luminance range, while the image data digital signal is selected and output when the image attribute signal provides no instruction to expand the luminance range. The thus output image data digital signal or luminance-converted image data digital signal is converted from digital to analog form in the D/A conversion means, and is accordingly output as the display data analog signal. In the first image data conversion apparatus, therefore, the luminance value represented by the display data analog signal can be increased only when the image attribute signal provides the instruction to expand the luminance range.

Alternatively, the above-described first image data conversion apparatus may comprise: a first color conversion means which performs color conversion on the image data digital signal input thereto, and outputs the result of the conversion as a first color-converted image data digital signal; a second color conversion means which performs color conversion on the image data digital signal input thereto and also performs luminance conversion on it so as to expand the luminance range, and then outputs the results of the conversion as a second color-converted image data digital signal; a data selection means which receives the first color-converted image data digital signal, the second color-converted image data digital signal and the image attribute signal, and selects the second color-converted image data digital signal when the image attribute signal provides the instruction to expand the luminance range, or selects the first color-converted image data digital signal when the image attribute signal provides no instruction to expand the luminance range, and then outputs the thus selected signal; and a D/A conversion means which converts, from digital to analog form, the first or second color-converted image data digital signal output from the data selection means, and outputs the result of the conversion as the display data analog signal.

With the configuration described above, the image data digital signal input to the first image data conversion apparatus is first subjected to color conversion in the first color conversion means, and is accordingly output as the first color-converted image data digital signal. In the second color conversion means, the image data digital signal is subjected to color conversion and is also subjected to luminance conversion so that the luminance range is expanded, and the resultant signal is output as the second color-converted image data digital signal. The first and second color-converted image data digital signals and the image attribute signal are input to the data selection means. In the data selection means, the second color-converted image data digital signal is selected and output when the image attribute signal provides the instruction to expand the luminance range, while the first color-converted image data digital signal is selected and output when the image attribute signal provides no instruction to expand the luminance range. The thus output first or second color-converted image data digital signal is converted from digital to analog form in the D/A conversion means, and is accordingly output as the display data analog signal. In the first image data conversion apparatus, therefore, the luminance value represented by the display data analog signal can be increased only when the image attribute signal provides the instruction to expand the luminance range.

Alternatively, the above-described first image data conversion apparatus may comprise: a first D/A conversion means which converts the image data digital signal input thereto from digital to analog form, and outputs the result of the conversion as a first image data analog signal; a second D/A conversion means which converts the image data digital signal input thereto from digital to analog form at a higher maximum output signal level as compared with the first D/A conversion means, and outputs the result of the conversion as a second image data analog signal; and a data selection means which receives the first image data analog signal, the second image data analog signal and the image attribute signal, and selects the second image data analog signal when the image attribute signal provides the instruction to expand the luminance range, or selects the first image data analog signal when the image attribute signal provides no instruction to expand the luminance range, and then outputs the thus selected signal as the display data analog signal.

With the configuration described above, the image data digital signal input to the first image data conversion apparatus is first converted from digital to analog form in the first D/A conversion means, and is accordingly output as the first image data analog signal. In the second D/A conversion means, the image data digital signal is converted from digital to analog form at a higher maximum output signal level as compared with the first D/A conversion means, and is accordingly output as the second image data analog signal. The first and second image data analog signals and the image attribute signal are input to the data selection means. In the data selection means, the second image data analog signal is selected when the image attribute signal provides the instruction to expand the luminance range, while the first image data analog signal is selected when the image attribute signal provides no instruction to expand the luminance range. The thus selected image data analog signal is output as the display data analog signal. In the first image data conversion apparatus, therefore, the luminance value represented by the display data analog signal can be increased only when the image attribute signal provides the instruction to expand the luminance range.

Alternatively, the above-described first image data conversion apparatus may comprise: a D/A conversion means which converts the image data digital signal input thereto from digital to analog form, and outputs the result of the conversion as an image data analog signal; and an amplifying means which receives the image data analog signal and the image attribute signal, and amplifies the received image data analog signal by a relatively high amplification factor when the image attribute signal provides the instruction to expand the luminance range, or amplifies the received image data analog signal by a relatively low amplification factor when the image attribute signal provides no instruction to expand the luminance range, and then outputs the result of the amplification as the display data analog signal.

With the configuration described above, the image data digital signal input to the first image data conversion apparatus is converted from digital to analog form in the D/A conversion means, and is accordingly output as the image data analog signal. The image data analog signal and the image attribute signal are input to the amplifying means. In the amplifying means, the image data analog signal is amplified by a relatively high amplification factor when the image attribute signal provides the instruction to expand the luminance range, while it is amplified by a relatively low amplification factor when the image attribute signal provides no instruction to expand the luminance range. The result of the amplification is output as the display data analog signal. In the first image data conversion apparatus, therefore, the luminance value represented by the display data analog signal can be increased only when the image attribute signal provides the instruction to expand the luminance range.

A second image data conversion apparatus according to the present invention receives an image data digital signal output from a video memory having a plurality of storage areas where a plurality of image data are respectively stored, and also receives an image attribute signal output from an attribute storage means where a rate of expansion of a luminance range as well as information on whether the expansion of the luminance range is required or not is stored as an image attribute corresponding to each of the storage areas. The image attribute signal provides an instruction to expand the luminance range and also indicates the rate of expansion of the luminance range when the image attribute indicates that the expansion of the luminance range is required, or provides no instruction to expand the luminance range when the image attribute indicates that the expansion of the luminance range is not required. On receiving the image data digital signal and the image attribute signal, the second image data conversion apparatus generates a display data analog signal which allows a display unit to display an image, and then outputs the thus generated signal to the display unit. In generating the display data analog signal, the second image data conversion apparatus increases the luminance value represented by the display data analog signal in accordance with the received image attribute signal only when the image attribute signal provides the instruction to expand the luminance range.

In the above-described second image data conversion apparatus, at the time when the image data digital signal is converted into the display data analog signal, the luminance value represented by the display data analog signal is increased in accordance with the rate of expansion of the luminance range indicated by the received image attribute signal only in the case where the image attribute signal provides the instruction to expand the luminance range. Thus, the display data analog signal carrying the image data the luminance range of which is required to be expanded represents a higher luminance value, as compared with the display data analog signal carrying the image data the luminance range of which is not required to be expanded. As a result, in a multi-window apparatus utilizing this second image data conversion apparatus, the combined image can be displayed on a single screen in such a manner that the images constituting the entire display image have their respective optimum levels of brightness which allow them to be most easily seen by the human eye.

Preferably, the above-described second image data conversion apparatus comprises: a plurality of luminance conversion means which perform luminance conversion on the image data digital signal input thereto so as to expand the luminance range, and output their respective results of the conversion as luminance-converted image data digital signals; a data selection means which receives the image data digital signal, the luminance-converted image data digital signals and the image attribute signal, and selects one digital signal from among the image data digital signal and the luminance-converted image data digital signals in accordance with the image attribute signal; and a D/A conversion means which converts, from digital to analog form, the digital signal selected by the data selection means, and outputs the result of the conversion as the display data analog signal.

With the configuration described above, the image data digital signal input to the second image data conversion apparatus is subjected to luminance conversion for the expansion of the luminance range in the above-mentioned two or more luminance conversion means provided with different rates of expansion of the luminance range, and accordingly, the respective resultant signals are output as the luminance-converted image data digital signals. The image data digital signal, the luminance-converted image data digital signals and the image attribute signal are input to the data selection means, where one digital signal is selected from among the image data digital signal and luminance-converted image data digital signals in accordance with the image attribute signal. The thus selected digital signal is converted from digital to analog form in the D/A conversion means, and is accordingly output as the display data analog signal. In the second image data conversion apparatus, therefore, the luminance value represented by the display data analog signal can be increased in accordance with the given rate of expansion of the luminance range only when the image attribute signal provides the instruction to expand the luminance range.

Alternatively, the above-described second image data conversion apparatus may comprise: a plurality of D/A conversion means which convert the image data digital signal input thereto from digital to analog form at different maximum output signal levels, and output their respective results of the conversion as image data analog signals; and a data selection means which receives the image data analog signals and the image attribute signal, and selects one analog signal from among the image data analog signals in accordance with the image attribute signal, and then outputs the thus selected analog signal as the display data analog signal.

With the configuration described above, the image data digital signal input to the second image data conversion apparatus is converted from digital to analog form at different maximum output levels respectively in the above-mentioned two or more D/A conversion means, and accordingly, the respective resultant signals are output as the image data analog signals. The image data analog signals and the image attribute signal are input to the data selection means, where one analog signal is selected from among these image data analog signals in accordance with the image attribute signal. The thus selected analog signal is output as the display data analog signal. In the second image data conversion apparatus, therefore, the luminance value represented by the display data analog signal can be increased in accordance with the given rate of expansion of the luminance range only when the image attribute signal provides the instruction to expand the luminance range.

A third image data conversion apparatus according to the present invention receives a non-luminance-adjusted image data digital signal output from a main memory having a plurality of storage areas where a plurality of image data are respectively stored, and also receives an image attribute signal output from an attribute storage means where information on whether expansion of a luminance range is required or not is stored as an image attribute corresponding to each of the storage areas. The image attribute signal provides an instruction to expand the luminance range when the image attribute indicates that the expansion of the luminance range is required, or provides no instruction to expand the luminance range when the image attribute indicates that the expansion of the luminance range is not required. On receiving the non-luminance-adjusted image data digital signal and the image attribute signal, the third image data conversion apparatus generates a luminance-adjusted image data digital signal and outputs it to a video memory. In generating the luminance-adjusted image data digital signal, the third image data conversion apparatus increases the luminance value represented by the luminance-adjusted image data digital signal only when the received image attribute signal provides the instruction to expand the luminance range.

In the above-described third image data conversion apparatus, at the time when the non-luminance-adjusted image data digital signal is converted into the luminance-adjusted image data digital signal, the luminance value represented by the luminance-adjusted image data digital signal is increased only in the case where the received image attribute signal provides the instruction to expand the luminance range. Thus, the luminance-adjusted image data digital signal carrying the image data the luminance range of which is required to be expanded represents a higher luminance value, as compared with the luminance-adjusted image data digital signal carrying the image data the luminance range of which is not required to be expanded. As a result, in a multi-window apparatus utilizing this third image data conversion apparatus, the combined image can be displayed on a single screen in such a manner that the images constituting the entire display image have their respective optimum levels of brightness which allow them to be most easily seen by the human eye.

Preferably, the above-described third image data conversion apparatus comprises: a luminance conversion means which performs luminance conversion on the non-luminance-adjusted image data digital signal input thereto so as to expand the luminance range, and outputs the result of the conversion as a luminance-converted image data digital signal; and a data selection means which receives the non-luminance-adjusted image data digital signal, the luminance-converted image data digital signal and the image attribute signal, and selects the luminance-converted image data digital signal when the image attribute signal provides the instruction to expand the luminance range, or selects the non-luminance-adjusted image data digital signal when the image attribute signal provides no instruction to expand the luminance range, and then outputs the thus selected signal as the luminance-adjusted image data digital signal.

With the configuration described above, the non-luminance-adjusted image data digital signal input to the third image data conversion apparatus is first subjected to luminance conversion for the expansion of the luminance range in the luminance conversion means, and the resultant signal is output as the luminance-converted image data digital signal. The non-luminance-adjusted image data digital signal, the luminance-converted image data digital signal and the image attribute signal are input to the data selection means. In the data selection means, the luminance-converted image data digital signal is selected when the image attribute signal provides the instruction to expand the luminance range, while the non-luminance-adjusted image data digital signal is selected when the image attribute signal provides no instruction to expand the luminance range. The thus selected signal is output as the luminance-adjusted image data digital signal. In the third image data conversion apparatus, therefore, the luminance value represented by the luminance-adjusted image data digital signal can be increased only when the image attribute signal provides the instruction to expand the luminance range.

Alternatively, the above-described third image data conversion apparatus may comprise: a first color conversion means which performs color conversion on the non-luminance-adjusted image data digital signal input thereto, and outputs the result of the conversion as a first color-converted image data digital signal; a second color conversion means which performs color conversion on the non-luminance-adjusted image data digital signal input thereto and also performs luminance conversion on it so as to expand the luminance range, and then outputs the results of the conversion as a second color-converted image data digital signal; and a data selection means which receives the first color-converted image data digital signal, the second color-converted image data digital signal and the image attribute signal, and selects the second color-converted image data digital signal when the image attribute signal provides the instruction to expand the luminance range, or selects the first color-converted image data digital signal when the image attribute signal provides no instruction to expand the luminance range, and then outputs the thus selected signal as the luminance-adjusted image data digital signal.

With the configuration described above, the non-luminance-adjusted image data digital signal input to the third image data conversion apparatus is first subjected to color conversion in the first color conversion means, and is accordingly output as the first color-converted image data digital signal. In the second color conversion means, the non-luminance-adjusted image data digital signal is subjected to color conversion and is also subjected to luminance conversion so that the luminance range is expanded, and the resultant signal is output as the second color-converted image data digital signal. The first and second color-converted image data digital signals and the image attribute signal are input to the data selection means. In the data selection means, the second color-converted image data digital signal is selected when the image attribute signal provides the instruction to expand the luminance range, while the first color-converted image data digital signal is selected when the image attribute signal provides no instruction to expand the luminance range. The thus selected signal is output as the luminance-adjusted image data digital signal. In the third image data conversion apparatus, therefore, the luminance value represented by the luminance-adjusted image data digital signal can be increased only when the image attribute signal provides the instruction to expand the luminance range.

A forth image data conversion apparatus according to the present invention receives a non-luminance-adjusted image data digital signal output from a main memory having a plurality of storage areas where a plurality of image data are respectively stored, and also receives an image attribute signal output from an attribute storage means where a rate of expansion of a luminance range as well as information on whether the expansion of the luminance range is required or not is stored as an image attribute corresponding to each of the storage areas. The image attribute signal provides an instruction to expand the luminance range and also indicates the rate of expansion of the luminance range when the image attribute indicates that the expansion of the luminance range is required, or provides no instruction to expand the luminance range when the image attribute indicates that the expansion of the luminance range is not required. On receiving the non-luminance-adjusted image data digital signal and the image attribute signal, the forth image data conversion apparatus generates a luminance-adjusted image data digital signal and outputs it to a video memory. In generating the luminance-adjusted image data digital signal, the forth image data conversion apparatus increases the luminance value represented by the luminance-adjusted image data digital signal in accordance with the received image attribute signal only when the image attribute signal provides the instruction to expand the luminance range.

In the above-described forth image data conversion apparatus, at the time when the non-luminance-adjusted image data digital signal is converted into the luminance-adjusted image data digital signal, the luminance value represented by the luminance-adjusted image data digital signal is increased in accordance with the rate of expansion of the luminance range indicated by the received image attribute signal only in the case where the image attribute signal provides the instruction to expand the luminance range. Thus, the luminance-adjusted image data digital signal carrying the image data the luminance range of which is required to be expanded represents a higher luminance value, as compared with the luminance-adjusted image data digital signal carrying the image data the luminance range of which is not required to be expanded. As a result, in a multi-window apparatus utilizing this forth image data conversion apparatus, the combined image can be displayed on a single screen in such a manner that the images constituting the entire display image have their respective optimum levels of brightness which allow them to be most easily seen by the human eye.

Preferably, the above-described forth image data conversion apparatus comprises: a plurality of luminance conversion means which perform luminance conversion on the non-luminance-adjusted image data digital signal input thereto so as to expand the luminance range, and output their respective results of the conversion as luminance-converted image data digital signals; and a data selection means which receives the non-luminance-adjusted image data digital signal, the luminance-converted image data digital signals and the image attribute signal, and selects one digital signal from among the non-luminance-adjusted image data digital signal and the luminance-converted image data digital signals in accordance with the image attribute signal, and then outputs the thus selected digital signal as the luminance-adjusted image data digital signal.

With the configuration described above, the non-luminance-adjusted image data digital signal input to the forth image data conversion apparatus is subjected to luminance conversion for the expansion of the luminance range in the above-mentioned two or more luminance conversion means provided with different rates of expansion of the luminance range, and accordingly, the respective resultant signals are output as the luminance-converted image data digital signals. The non-luminance-adjusted image data digital signal, the luminance-converted image data digital signals and the image attribute signal are input to the data selection means. In the data selection means, one digital signal is selected from among the non-luminance-adjusted image data digital signal and luminance-converted image data digital signals in accordance with the image attribute signal. The thus selected digital signal is output as the luminance-adjusted image data digital signal. In the forth image data conversion apparatus, therefore, the luminance value represented by the luminance-adjusted image data digital signal can be increased in accordance with the given rate of expansion of the luminance range only when the image attribute signal provides the instruction to expand the luminance range.

DETAILED DESCRIPTION OF THE INVENTION

Embodiments of the present invention will be described below with reference to the drawings.

Figure 1:
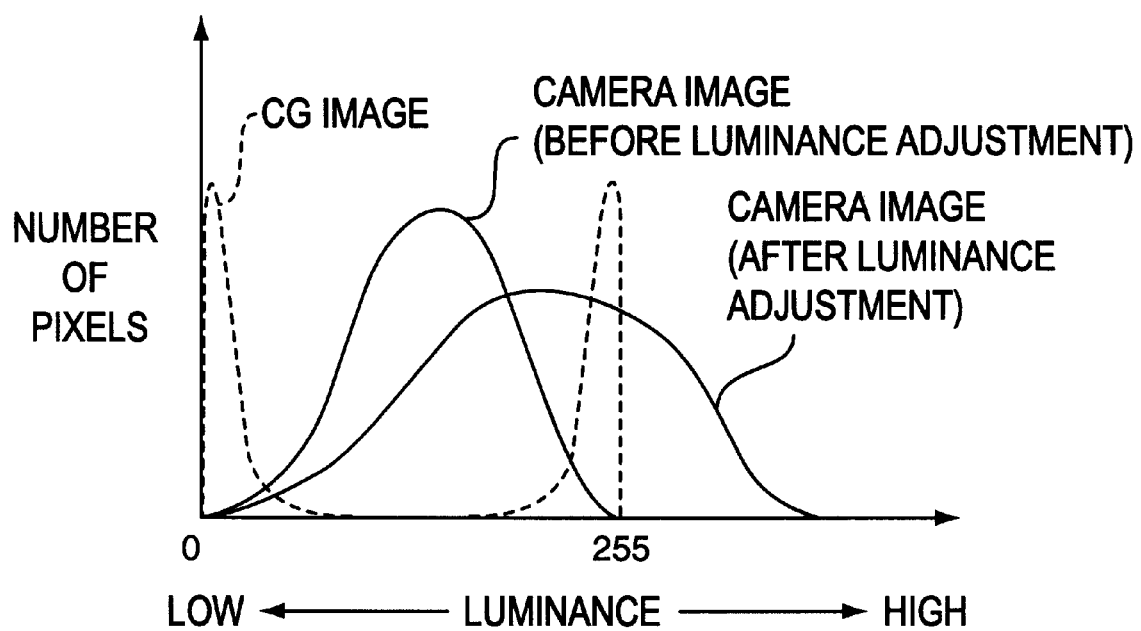
FIG. 1 is a graph showing the pixel distribution with respect to luminance in each set of image data according to embodiments of the present invention.

FIG. 1 shows the pixel distribution with respect to luminance in each set of image data. The thin solid line indicates the pixel distribution of an image produced by using a camera (i.e., a camera image), which is not yet subjected to luminance adjustment. The thick solid line indicates the pixel distribution of the camera image which has been subjected to luminance adjustment. The broken line indicates the pixel distribution of an image produced by computer (i.e., a CG image).

Referring to FIG. 1, the main feature of the present invention is as follows: Before the CG and camera images are displayed on the screen, the luminance range of only the camera image is expanded so that the pixel distribution of the camera image indicated by the thin solid line is converted into such a distribution as indicated by the thick solid line. Specifically, the pixel distribution of the camera image, in which a large number of pixels are originally distributed in the vicinity of the intermediate luminance values, is converted into such a pixel distribution as indicated by the thick solid line where a large number of pixels are distributed in the vicinity of higher luminance value (255). If the camera and CG images are displayed on the same screen after such conversion has been carried out, then the optimum levels of screen brightness which allow the CG and camera images to be easily seen become substantially equal. Accordingly, the camera image can be displayed with improved brightness and clarity as compared with the conventional multi-window apparatus, with the CG image still kept easy to see.

It is of course possible to reduce the luminance range of the CG image and then increase the luminance of the entire screen. This procedure functions substantially in the same manner as that described above, and can accordingly attain the same effect.

The embodiments will be more specifically described below with reference to the drawings.

(First Embodiment)

Figure 2:
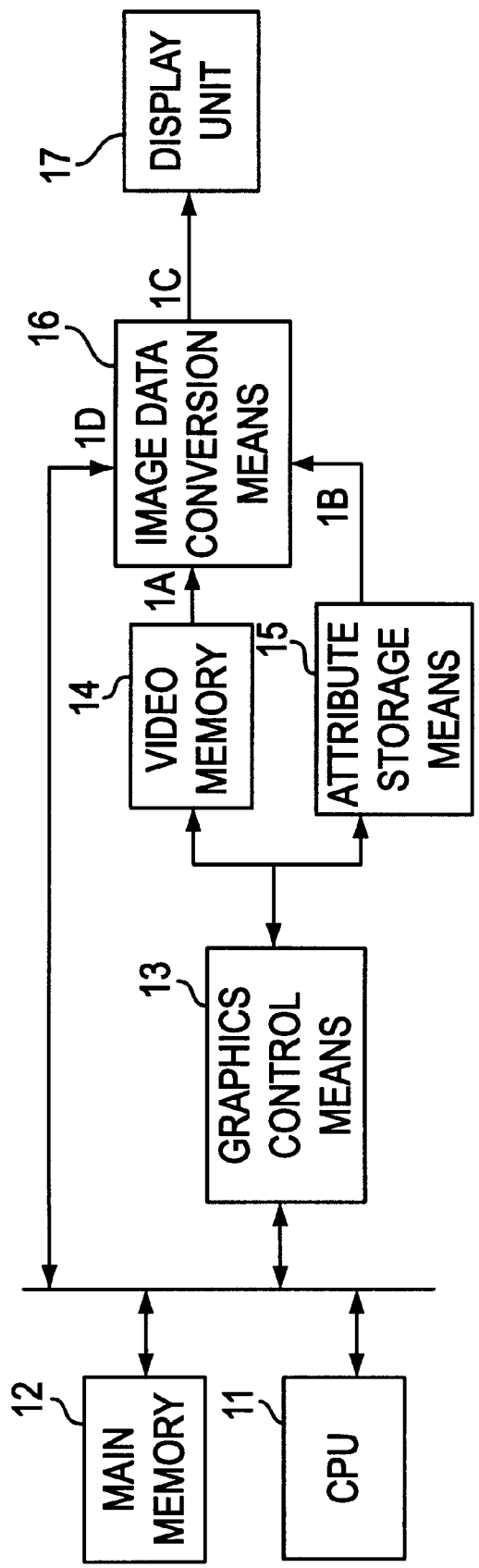
FIG. 2 is a diagram showing the system configuration of multi-window apparatuses according to first to forth embodiments of the present invention.

FIG. 2 shows the system configuration of a multi-window apparatus according to the present embodiment.

In FIG. 2, the reference numeral 11 denotes a central processing unit, 12 a main memory, 13 a graphics control means, 14 a video memory, 15 an attribute storage means, 16 an image data conversion means, and 17 a display unit, the components denoted by 11 to 16 constituting an image combining means.

The central processing unit 11 executes a program stored in the main memory 12, thereby giving instructions to the graphics control means 13 for the input to or output from the video memory 14 and the attribute storage means 15, or setting the details of conversion to be carried out by the image data conversion means 16. The graphics control means 13 receives instructions from the central processing unit 11 and accordingly controls the video memory 14 and the attribute storage means 15 to allow them to execute input and output.

The video memory 14 stores image data to be displayed. In the present embodiment, the video memory 14 can store a single page of image data having the area of a 1024×800 array of pixels, 1024 pixels in each row being arranged along a horizontal direction, and 800 pixels in each column being arranged along a vertical direction. It is understood that the video memory 14 may also be so arranged that a plurality of pages of image data can be stored therein, or may be so arranged as to store separate sets of image data respectively corresponding to the windows.

In the attribute storage means 15, information on whether or not the areas of the image data stored in the video memory 14 require expansion of the luminance range is stored as image attributes corresponding to these areas. In the present embodiment, the attribute storage means 15 is composed of a memory having a 1024×800 array of 1-bit storage areas (corresponding to the above-mentioned 1024×800 array of pixels in the image data stored in the video memory 14). In each 1-bit area, the bit is set to 1 when a corresponding area of the image data stored in the video memory 14 requires the expansion of the luminance range, while it is set to 0 when the corresponding area does not require the expansion of the luminance range.

The image data conversion means 16 receives an image data digital signal 1a output from the video memory 14 and also receives an image attribute signal 1b output from the attribute storage means 15, and then outputs a display data analog signal 1c to the display unit 17. The display unit 17 allows the image to be displayed on its monitor screen in accordance with the display data analog signal 1c output from the image data conversion means 16.

Figure 3:
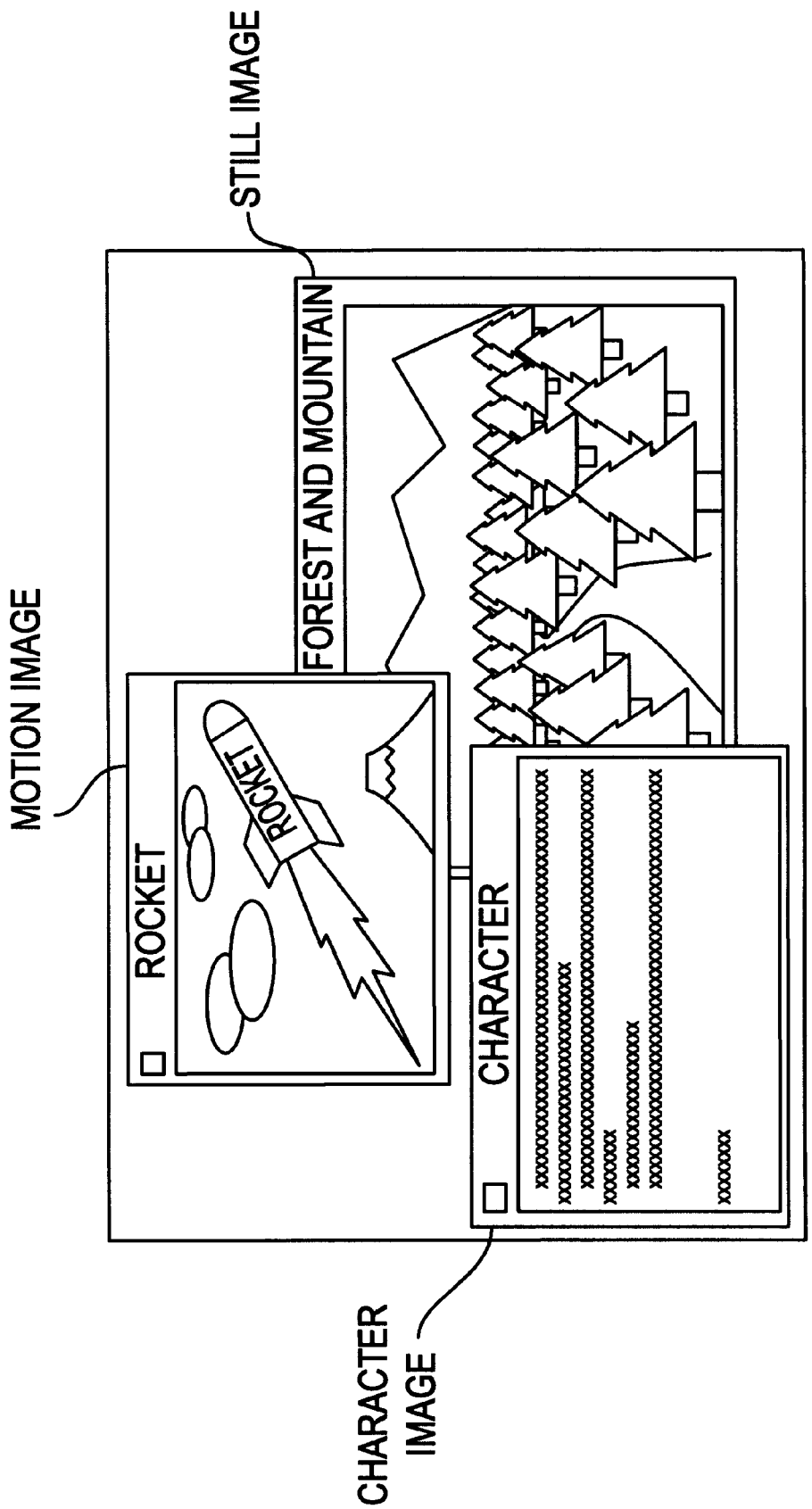
FIG. 3 shows an example of image data to be displayed on the screen.

It is herein assumed that image data such as shown in FIG. 3 are stored in the video memory 14. There are three windows respectively holding a character image, a still image of a landscape and a motion image of a rocket. The image data are sequentially read out along the horizontal direction from top left to bottom right, and then output as the image data digital signal 1a.

Figure 4:
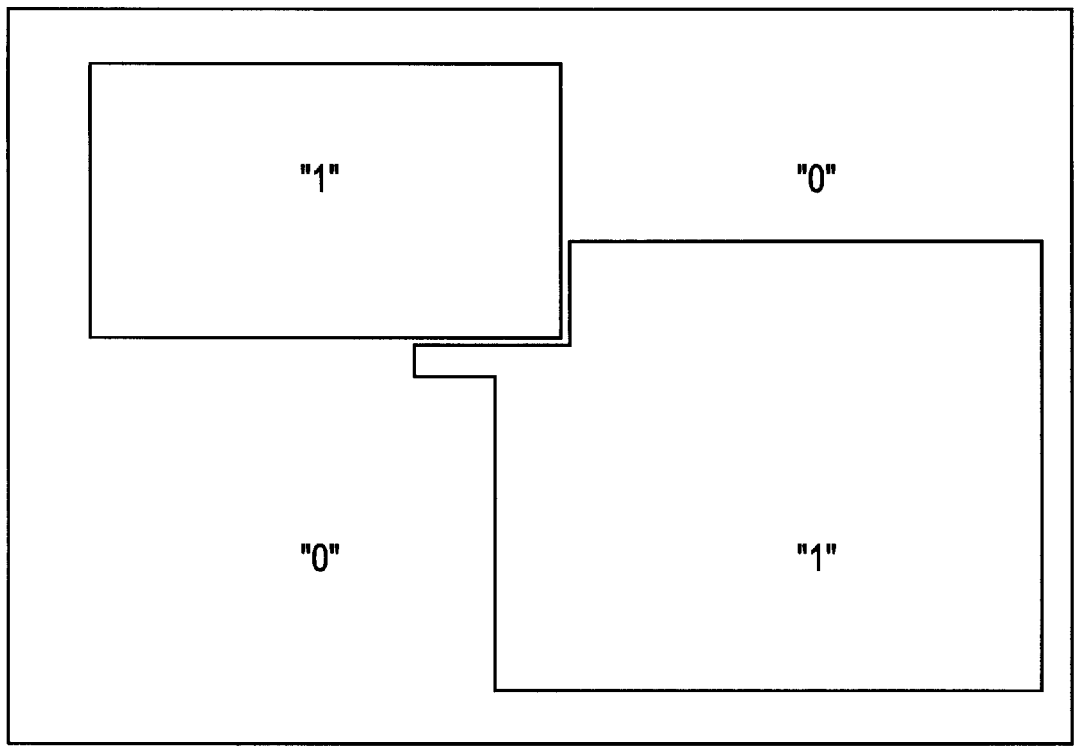
FIG. 4 is a diagram showing the image attributes of the image data of FIG. 3.

In this case, in the attribute storage means 15, "1" is stored as the image attribute in each of the storage areas corresponding to the display areas of the above-mentioned still and motion images, while "0" is stored as the image attribute in each of the other storage areas, as shown in FIG. 4. These stored image attributes are sequentially read out along the horizontal direction from top left to bottom right, in synchronization with the output of the image data digital signal 1a from the video memory 14, and are output as the image attribute signal 1b which provides information on whether the luminance range should be expanded or not.

When the input image attribute signal 1b has a value of "1" (which provides the instruction to expand the luminance range), the image data conversion means 16 expands the luminance range of the image data in the input image data digital signal 1a, thereby generating and outputting the display data analog signal 1c. When the input image attribute signal 1b has a value of "0" (which provides no instruction to expand the luminance range), the image data conversion means 16 generates and outputs the display data analog signal 1c without expanding the luminance range of the image data in the input image data digital signal 1a. In accordance with the display data analog signal 1c, the display unit 17 allows the image to be displayed on its monitor screen.

Through the above-described operation, the luminance ranges of still and motion images are expanded, so that more realistic display images with higher contrast are obtained. Furthermore, a CG image such as a character image is displayed without expansion of its luminance range, so that the resultant display image is not too bright and is easy to see as in the case of the conventional multi-window apparatus.

Next, the image data conversion means will be described in more detail.

Figure 5:
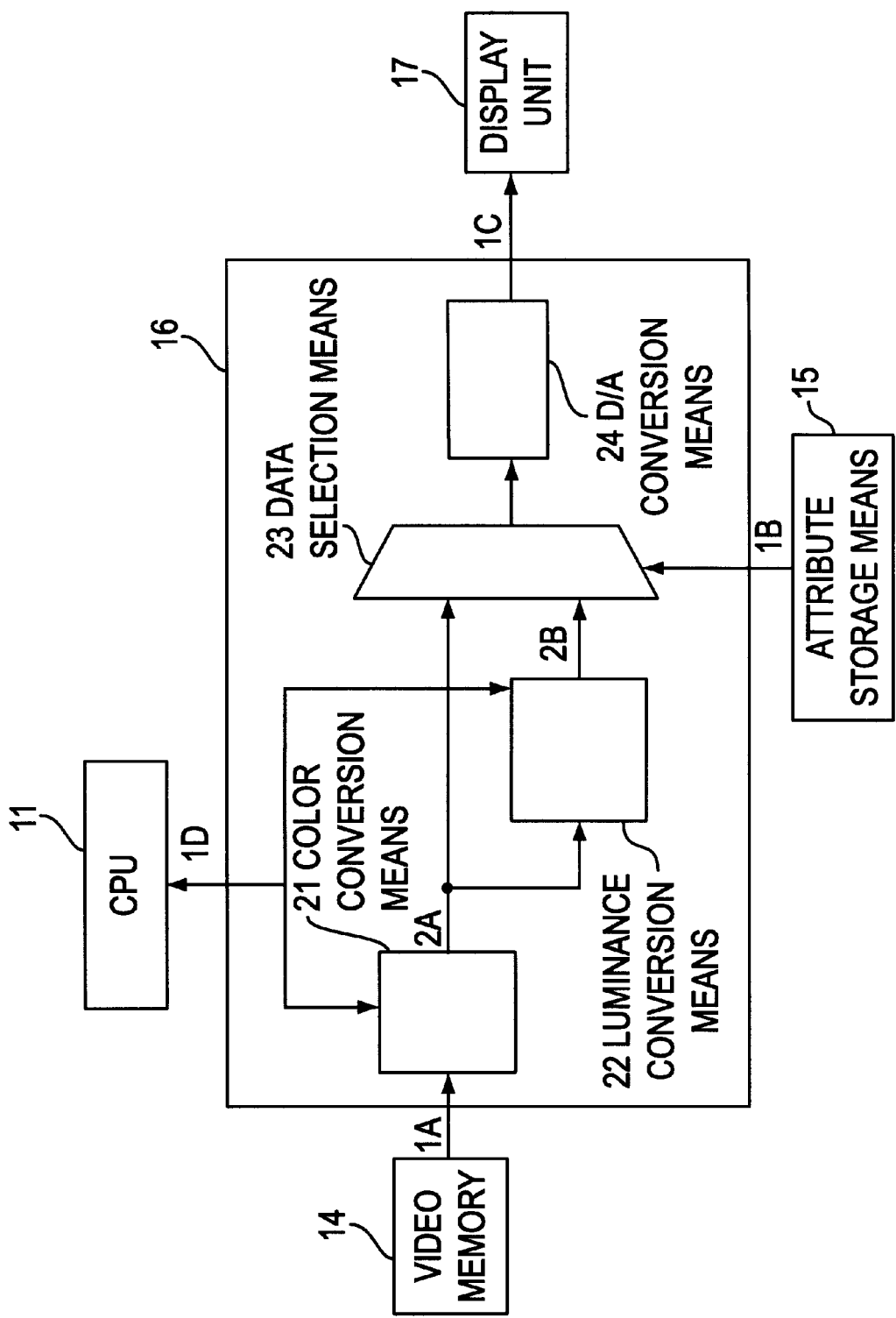
FIG. 5 is a diagram showing the configuration of an image data conversion means according to the first embodiment of the present invention.

FIG. 5 shows the configuration of the image data conversion means 16 according to the present embodiment. In FIG. 5, the reference numeral 21 denotes a color conversion means, 22 a luminance conversion means, 23 a data selection means, and 24 a D/A conversion means.

It is assumed that the image data digital signal 1a is a digital signal carrying three sets of 8-bit data (24 bits in total), each representing one of the three primary colors: red (hereinafter referred to as "R"), green ("G") and blue ("B"), and that the image attribute signal 1b is a digital signal carrying a 1-bit datum with a value of "1" (which provides the instruction to expand the luminance range) or "0" (which provides no instruction to expand the luminance range).

Figure 6:
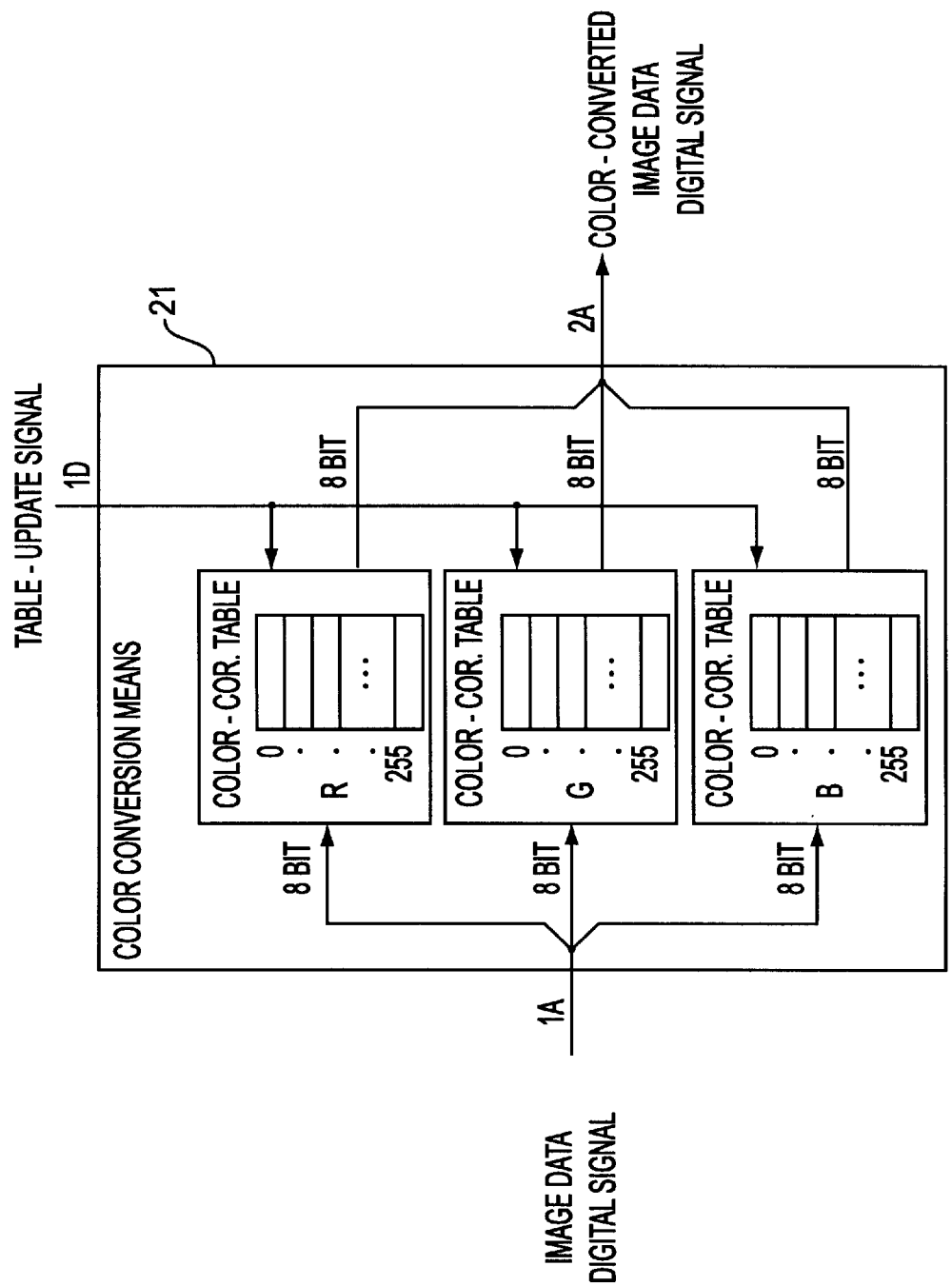
FIG. 6 is a diagram showing the configuration of color conversion means according to the first, third and forth embodiments and a fifth embodiment of the present invention.

The color conversion means 21 has a color-correspondence table for each of the colors R, G and B, containing data on the color conversion of each color, as shown in FIG. 6. Each of the color-correspondence tables has 256 (=$2^8$) entries. In each entry, color data (8 bits) to be obtained after color conversion is set. The color conversion is carried out as follows: In accordance with the value of the input image data digital signal 1a, an entry is selected from each of the three color-correspondence tables. The three sets of color data which are respectively set in the thus selected three entries are read out and combined, and accordingly, the combined data is output as a color-converted image data digital signal 2a. The color data in the entries of the color-correspondence tables can be arbitrarily set in accordance with a table-update signal 1d sent from the central processing unit 11; for example, the color data can be set so that gamma correction (by which the color of the entire image is corrected in accordance with the characteristics of the display unit), conversion of the color tone, or the like, will be carried out.

Figure 7:
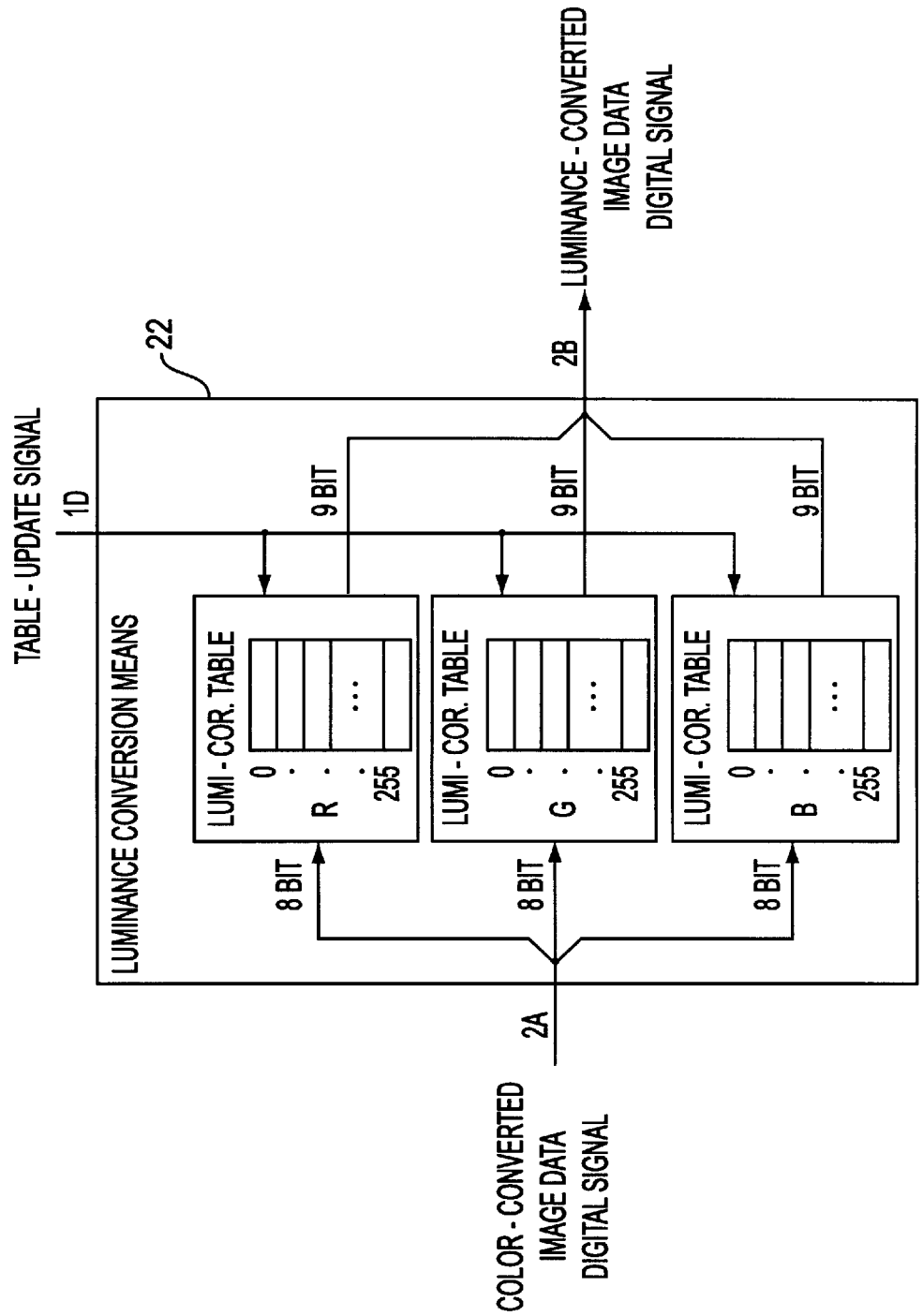
FIG. 7 is a diagram showing the configuration of luminance conversion means according to the first and fifth embodiments of the present invention.

The luminance conversion means 22 has a luminance-correspondence table for each of the colors R, G and B, containing data on the luminance conversion of each color, as shown in FIG. 7. Each of the luminance-correspondence tables has 256 entries, and color data (9 bits) to be obtained after luminance conversion is set in each entry. The color data in the entries of the luminance-correspondence tables can be arbitrarily set in accordance with a table-update signal 1d sent from the central processing unit 11.

The luminance conversion is carried out as follows: In accordance with the value of the input color-converted image data digital signal 2a, an entry is selected from each of the three luminance-correspondence tables. Then, the three sets of color data which are respectively set in the thus selected three entries are read out and combined, and accordingly, the combined data is output as a luminance-converted image data digital signal 2b. Through this luminance conversion, the color-converted image data digital signal 2a which carries three sets of 8-bit data respectively representing R, G and B is converted into the luminance-converted image data digital signal 2b which carries three sets of 9-bit data respectively representing R, G and B, so that the luminance range can be expanded by a maximum factor of 2.

The data selection means 23 receives the color-converted image data digital signal 2a, the luminance-converted image data digital signal 2b and the image attribute signal 1b. When the value of the image attribute signal 1b is "1" (which provides the instruction to expand the luminance range), the data selection means 23 selects and outputs the luminance-converted image data digital signal 2b. On the other hand, when the value of the image attribute signal 1b is "0" (which provides no instruction to expand the luminance range), the data selection means 23 selects and outputs the color-converted image data digital signal 2a. When the color-converted image data digital signal 2a is selected, one bit with a value of "0" is added, as the most significant bit, to each of the three sets of 8-bit data respectively representing R, G and B, so that the resultant signal, which carries three sets of 9-bit data respectively representing R, G and B, is output.

The signal output from the data selection means 23 is input to the D/A conversion means 24, where each of the three sets of data respectively representing R, G and B is converted with a 9-bit precision from digital to analog form, and the resultant signal is output as the display data analog signal 1c.

As described above, in the image data conversion means 16 of the present embodiment, the luminance ranges of only the images that require the expansion of their luminance ranges can be expanded by a maximum factor of 2. Furthermore, the number of bits constituting the color data which is set in each entry of the luminance-correspondence tables of the luminance conversion means 22 is not limited to 9, so that the rate of expansion of the luminance range can be set freely as required.

Figure 8:
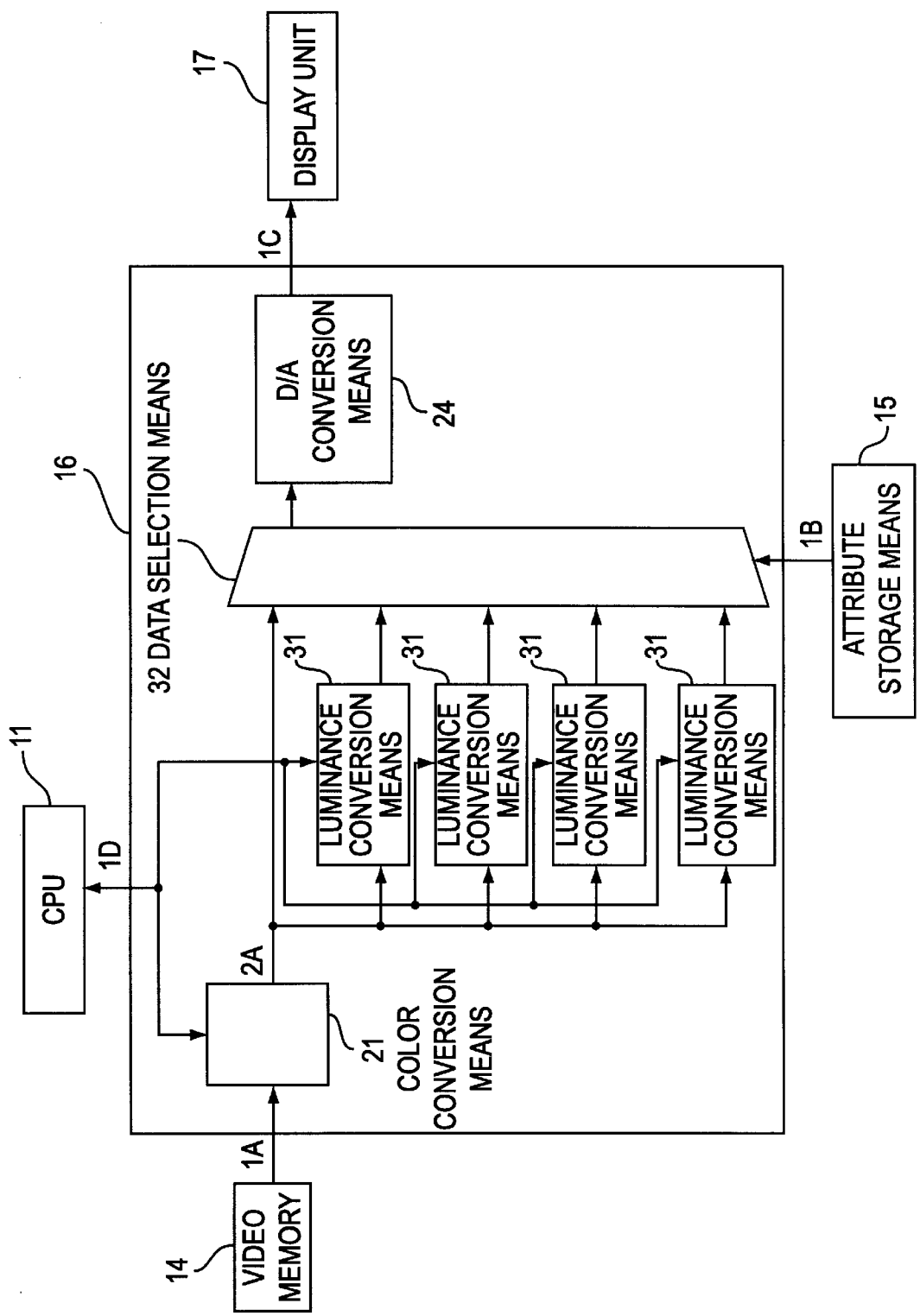
FIG. 8 is a diagram showing an image data conversion means according to the first embodiment of the present invention, which includes a plurality of luminance conversion means.

In the present embodiment, only the information on whether the expansion of the luminance range is required or not is stored as the image attribute. In another embodiment, however, the rates of expansion of the luminance range which are required by the respective areas of the image data in the video memory are also stored as the image attributes, so that the luminance range of the image is expanded by using these two or more different rates of expansion. FIG. 8 shows an image data conversion means 16 according to such an embodiment, which has a plurality of luminance conversion means 31 using different rates of expansion of the luminance range. In the image data conversion means 16 of FIG. 8, one signal is selected from among the color-converted image data digital signal 2a and a plurality of signals output from these luminance conversion means 31, in accordance with the image attribute signal 1b, and then the selected signal is output.

(Second Embodiment)

The following describes an embodiment using an image data conversion means which has a configuration different from that of the image data conversion means of the first embodiment. The system configuration and operation of a multi-window apparatus of the present embodiment are the same as those of the multi-window apparatus of the first embodiment described above.

Figure 9:
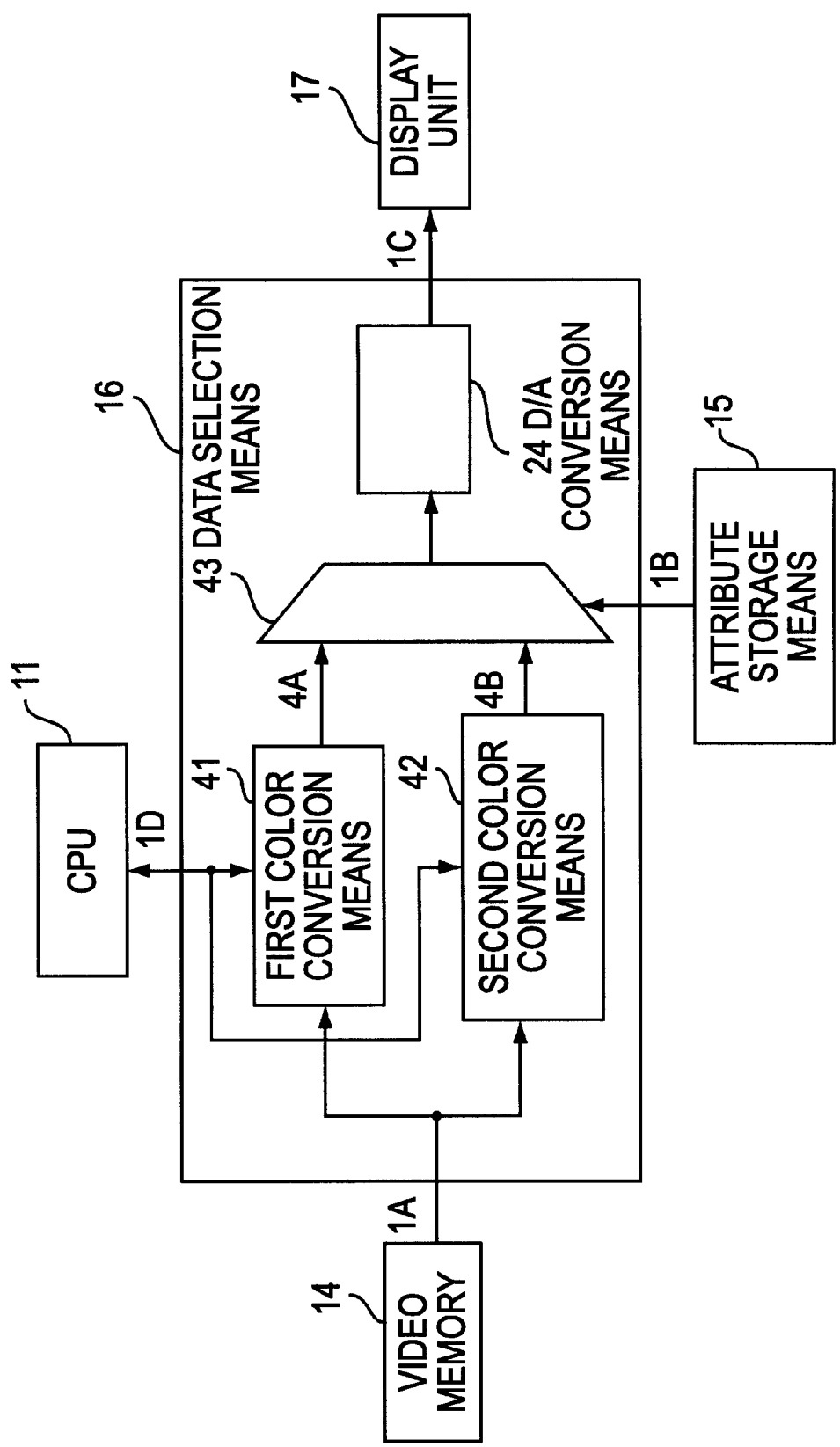
FIG. 9 is a diagram showing an image data conversion means according to the second embodiment of the present invention.

FIG. 9 shows the configuration of the image data conversion means 16 according to the present embodiment. In FIG. 9, the reference numeral 41 denotes a first color conversion means, 42 a second color conversion means, 43 a data selection means, and 24 a D/A conversion means.

In the present embodiment, the image data digital signal 1a output from the video memory 14 which stores images such as shown in FIG. 3 is assumed to be a digital signal which carries three sets of 8-bit data (24 bits in total) respectively representing R, G and B, in cases where the still image of the landscape and the motion image of the rocket are output. On the other hand, in cases where the character image and the images corresponding to the other areas of the display screen are output, the image data digital signal 1a output from the video memory 14 is assumed to be a digital signal which carries 8 bits of data representing a color and 16 bits of dummy data (24 bits in total). The former signal is referred to as a full color signal, while the latter is referred to as a pseudo color signal. It is assumed that the image attribute signal 1b is a digital signal carrying a 1-bit datum with a value of "1" (which provides the instruction to expand the luminance range) or "0" (which provides no instruction to expand the luminance range).

Figure 10:
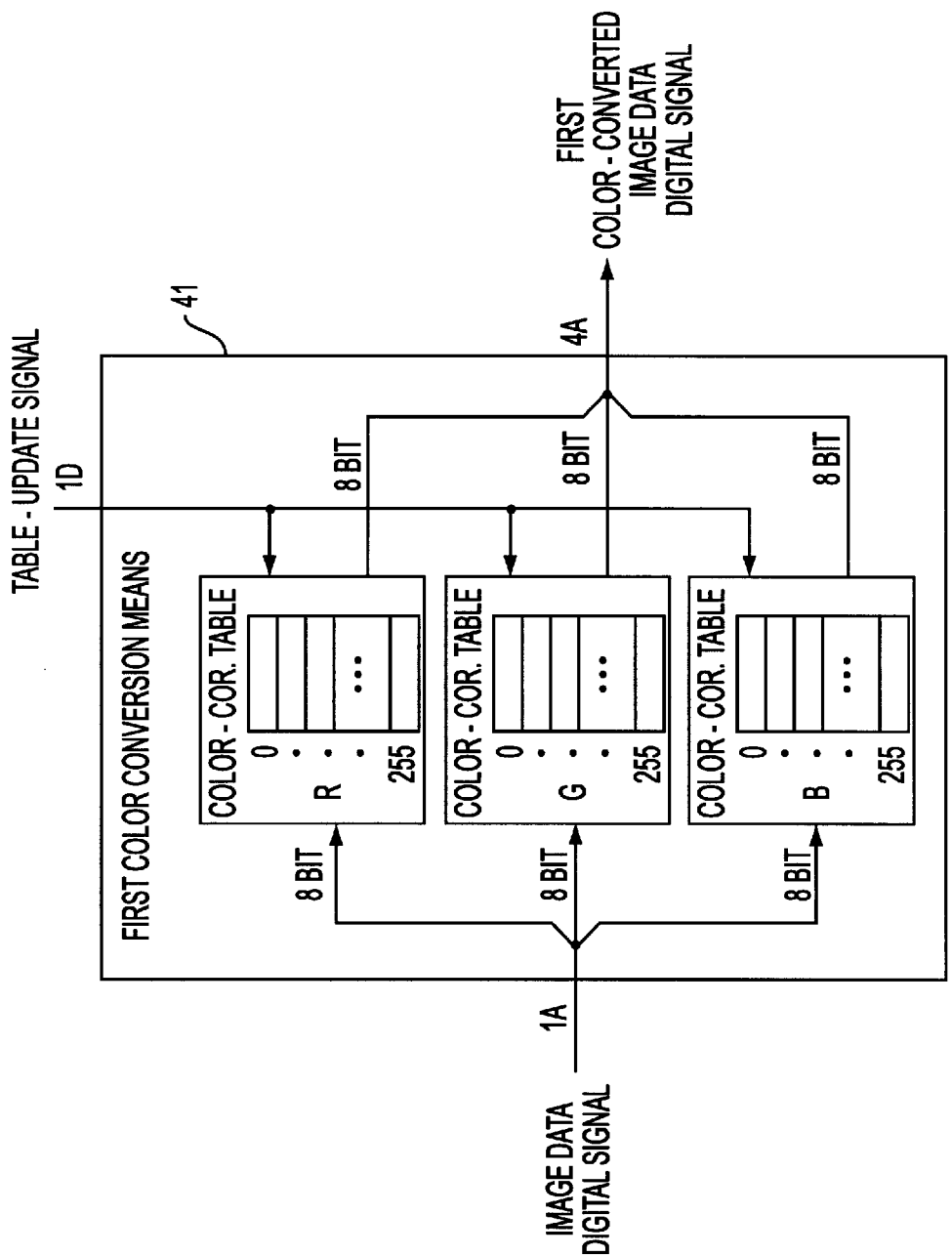
FIG. 10 is a diagram showing the configuration of first color conversion means according to the second embodiment and a sixth embodiment of the present invention.

The first color conversion means 41 has a color-correspondence table for each of the colors R, G and B, containing data on the color conversion of each color, as shown in FIG. 10. Each of the color-correspondence tables has 256 entries. In each entry, color data (8 bits) to be obtained after color conversion is set in accordance with a table-update signal 1d from the central processing unit 11. The color conversion is carried out as follows: In accordance with the 8 bits of data representing a color in the input image data digital signal 1a, an entry is selected from each of the three color-correspondence tables. The three sets of color data which are respectively set in the thus selected entries are read out and combined, and accordingly the combined data is output as a first color-converted image data digital signal 4a. The first color conversion means 41 can carry out conversion of a pseudo color signal into a full color signal, as well as the color conversion.

Figure 11:
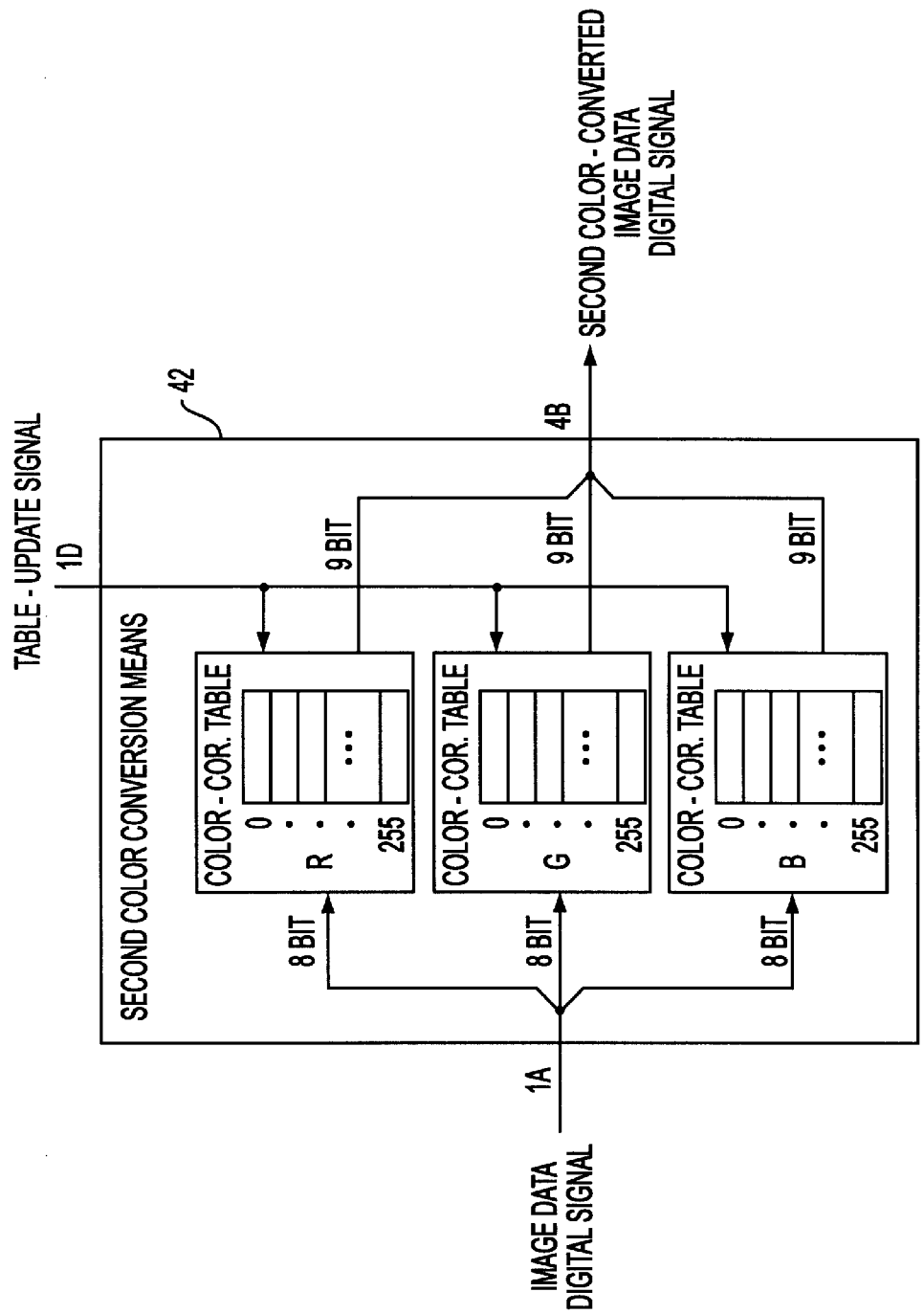
FIG. 11 is a diagram showing the configuration of second color conversion means according to the second and sixth embodiments of the present invention.

The second color conversion means 42 has a color-correspondence table for each of the colors R, G and B, containing data on the color conversion of each color, as shown in FIG. 11. Each of the color-correspondence tables has 256 entries. In each entry, color data (9 bits) to be obtained after color conversion is set in accordance with a table-update signal 1d from the central processing unit 11. The color conversion is carried out as follows: In accordance with the value of the input image data digital signal 1a, an entry is selected from each of the three color-correspondence tables. Then, the three sets of color data which are respectively set in the thus selected entries are read out and combined, and accordingly, the combined data is output as a second color-converted image data digital signal 4b. In the second color conversion means 42, a full color signal which carries three sets of 8-bit data respectively representing R, G and B is converted into a second color-converted image data digital signal 4b which carries three sets of 9-bit data respectively representing R, G and B. Through this operation, the second color conversion means 42 can carry out the color conversion and can also expand the luminance range by a maximum factor of 2.

The data selection means 43 receives the first color-converted image data digital signal 4a, the second color-converted image data digital signal 4b and the image attribute signal 1b. When the image attribute signal 1b has a value of "1" (which provides the instruction to expand the luminance range), the data selection means 43 selects and outputs the second color-converted image data digital signal 4b. On the other hand, when the image attribute signal 1b has a value of "0" (which provides no instruction to expand the luminance range), the data selection means 43 selects and outputs the first color-converted image data digital signal 4a. When the first color-converted image data digital signal 4a is selected, one bit with a value of "0" is added, as the most significant bit, to each of the three sets of 8-bit data respectively representing R, G and B, so that the resultant signal, which carries three sets of 9-bit data respectively representing R, G and B, is output.

The signal (which carries three sets of 9-bit data respectively representing R, G and B) output from the data selection means 43 is input to the D/A conversion means 24, where each of the three sets of data respectively representing R, G and B is converted with a 9-bit precision from digital to analog form, and the resultant signal is output as the display data analog signal 1c.

As described above, an image which requires the expansion of its luminance range and an image which does not require the expansion of its luminance range can be separately subjected to color conversion. This makes it possible to perform luminance adjustment by which the entire display image on the screen can be made easier to see.

Although the character image is represented by the pseudo color signal in the present embodiment, it can also be represented by a full color signal as in the case of the camera images.

(Third Embodiment)

The following describes an embodiment using an image data conversion means which has a different configuration from those of the image data conversion means of the first and second embodiments. The system configuration and operation of a multi-window apparatus of the present embodiment are the same as those of the multi-window apparatus of the first embodiment described above.

Figure 12:
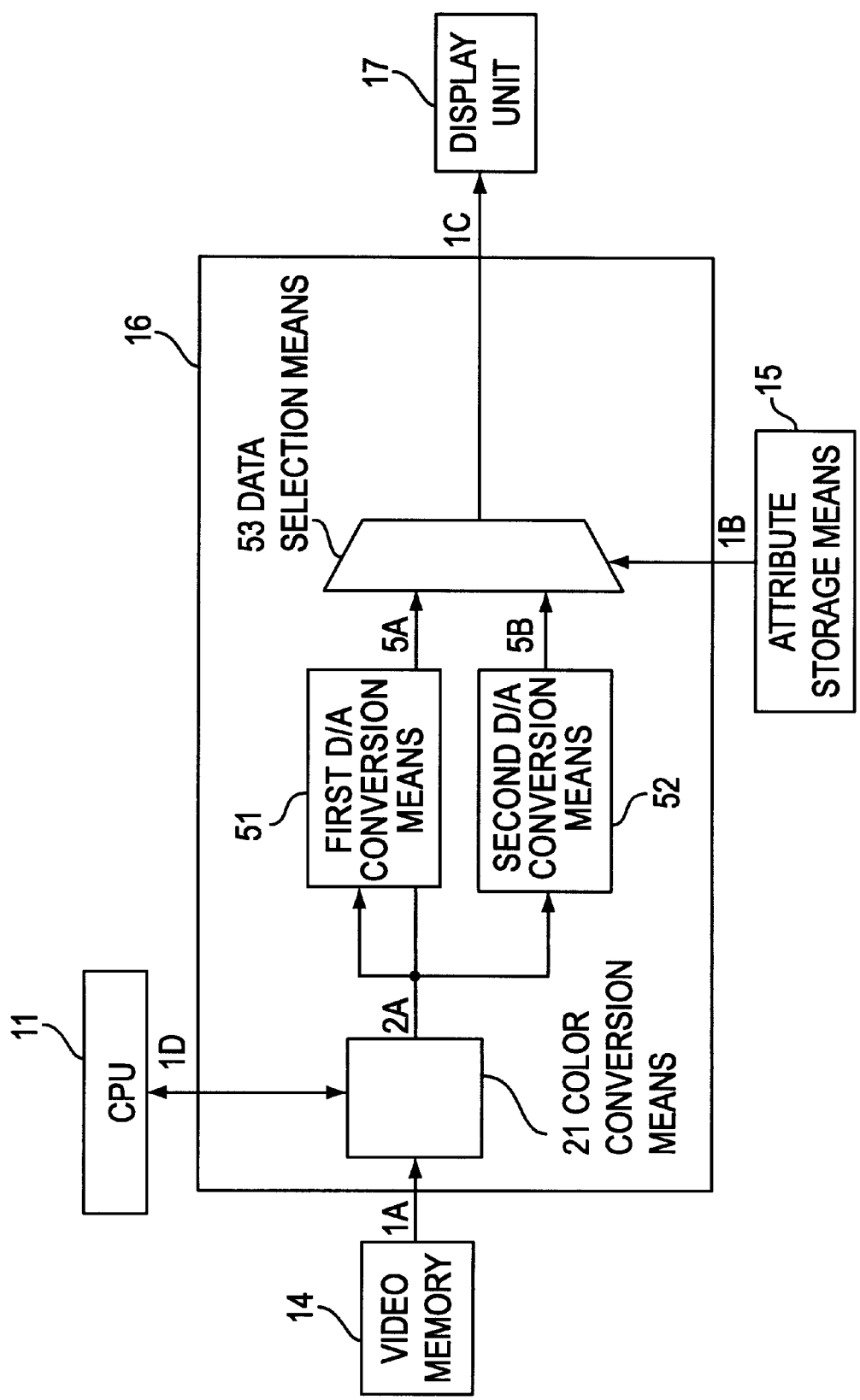
FIG. 12 is a diagram showing the configuration of an image data conversion means according to the third embodiment of the present invention.

FIG. 12 shows the configuration of the image data conversion means 16 according to the present embodiment. In FIG. 12, the reference numeral 21 denotes a color conversion means, 51 a first D/A conversion means, 52 a second D/A conversion means, and 53 a data selection means.

It is herein assumed that the image data digital signal 1a output from the video memory 14 is a digital signal which carries three sets of 8-bit data (24 bits in total) respectively representing R, G and B, and that the image attribute signal 1b is a digital signal carrying a 1-bit datum with a value of "1" (which provides the instruction to expand the luminance range) or "0" (which provides no instruction to expand the luminance range).

The color conversion means 21, which is the same as that of the first embodiment described above, has a configuration such as shown in FIG. 6. The color conversion means 21 outputs the result of color conversion as a color-converted image data digital signal 2a.

In the first D/A conversion means 51, each of the three sets of data respectively representing R, G and B in the color-converted image data digital signal 2a is converted with an 8-bit precision from digital to analog form, and accordingly, the resultant signal is output as a first image data analog signal 5a. In the present embodiment, the maximum output level of the first D/A conversion means 51 is set to 1 V. Thus, when the value of the color-converted image data digital signal 2a is 255, the maximum output voltage, i.e., 1 V, is output as the first image data analog signal 5a.

In the second D/A conversion means 52, each of the three sets of data respectively representing R, G and B in the color-converted image data digital signal 2a is converted with an 8-bit precision from digital to analog form, and accordingly, the resultant signal is output as a second image data analog signal 5b. In the present embodiment, the maximum output level of the second D/A conversion means 52 is set to 2 V. Thus, when the value of the color-converted image data digital signal 2a is 255, the maximum output voltage, i.e., 2 V, is output as the second image data analog signal 5b.

As a result of the D/A conversion of the same color-converted image data digital signal 2a, the output level of the second image data analog signal 5b is twice that of the first image data analog signal 5a. Therefore, the second image data analog signal 5b can represent a luminance range which is twice as wide as that represented by the first image data analog signal 5a.

The data selection means 53 receives the first image data analog signal 5a, the second image data analog signal 5b and the image attribute signal 1b. When the image attribute signal 1b has a value of "1" (which provides the instruction to expand the luminance range), the data selection means 53 selects the second image data analog signal 5b. On the other hand, when the image attribute signal 1b has a value of "0" (which provides no instruction to expand the luminance range), the data selection means 53 selects the first image data analog signal 5a. The thus selected analog signal 5a or 5b is output as the display data analog signal 1c.

As described above, only when the image requires expansion of its luminance range, the luminance range is expanded by the second D/A conversion means 52. Through this adjustment of luminance, the entire display image on the screen can be made easier to see.

Furthermore, the use of the D/A conversion means in the expansion of the luminance range can prevent the occurrence of a quantizing error which is inevitable when the expansion of the luminance range is carried out with the signal kept in digital form as in the case of the first and second embodiments.

Figure 13:
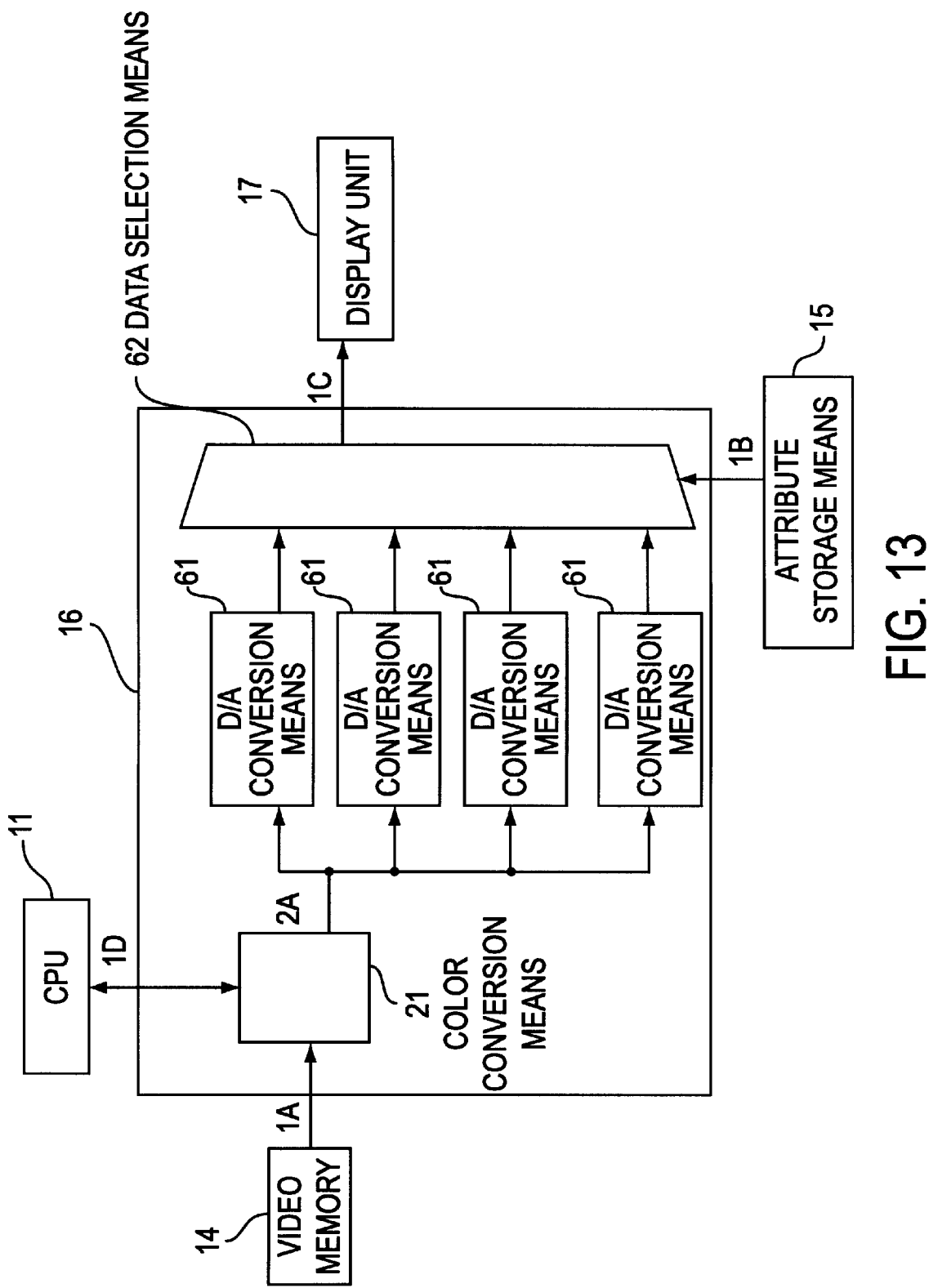
FIG. 13 is a diagram showing an image data conversion means according to the third embodiment of the present invention, which includes a plurality of D/A conversion means.

In the present embodiment, only the information on whether the expansion of the luminance range is required or not is stored as the image attribute. In another embodiment, however, the rates of expansion of the luminance range which are required by the respective areas of the image data in the video memory are also stored as the image attributes, so that the luminance range of the image is expanded by using these two or more different rates of expansion. FIG. 13 shows an image data conversion means 16 according to such an embodiment, which has a plurality of D/A conversion means 61 using different rates of expansion of the luminance range. In the image data conversion means 16 of FIG. 13, one signal is selected from among the analog signals output from these D/A conversion means 61 in accordance with the image attribute signal 1b, and then the selected signal is output as the display data analog signal 1c.

(Forth Embodiment)

The following describes an embodiment using an image data conversion means which has a configuration different from those of the image data conversion means of the first, second and third embodiments. The system configuration and operation of a multi-window apparatus of the present embodiment are the same as those of the multi-window apparatus of the first embodiment described above.

Figure 14:
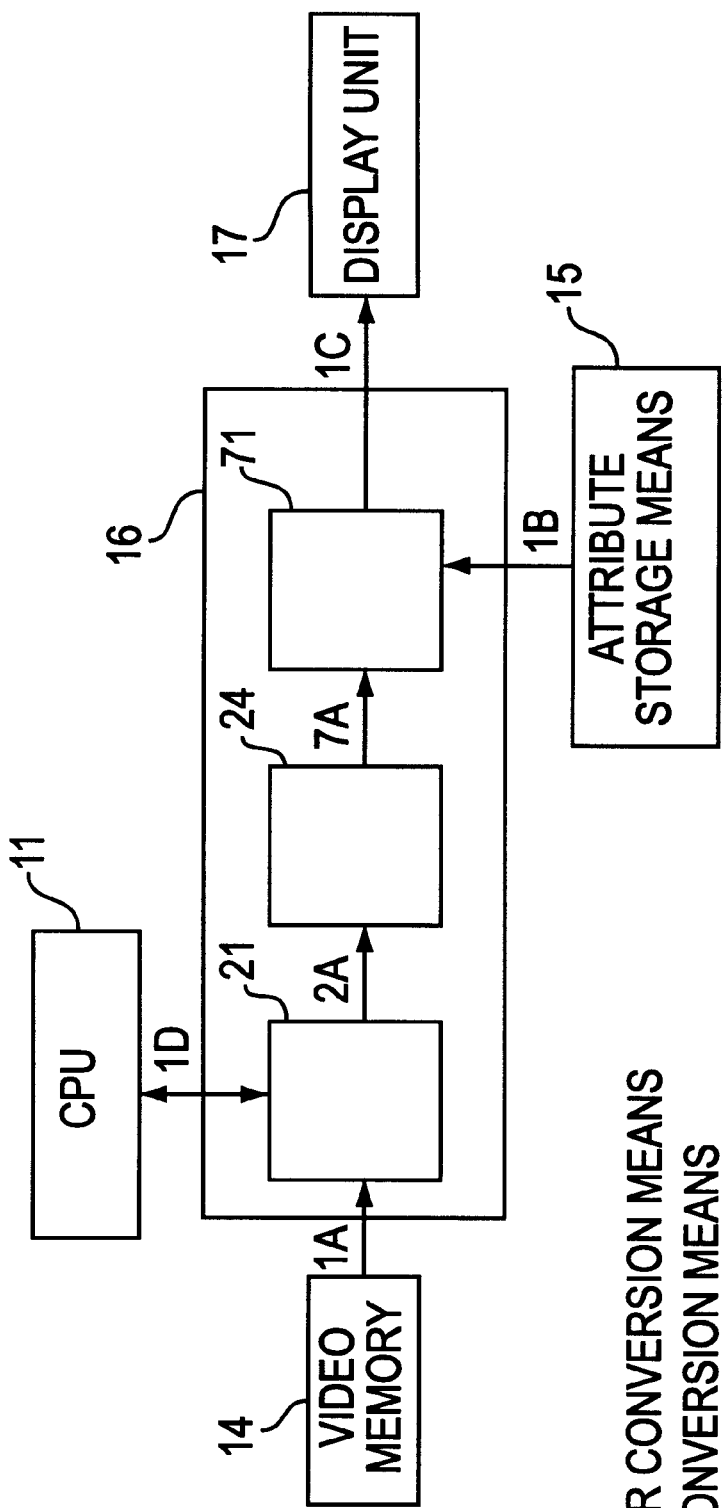
FIG. 14 is a diagram showing the configuration of an image data conversion means according to the forth embodiment of the present invention.

FIG. 14 shows the configuration of the image data conversion means 16 according to the present embodiment. In FIG. 14, the reference numeral 21 denotes a color conversion means, 24 a D/A conversion means, and 71 an amplifying means.

It is herein assumed that the image data digital signal 1a is a digital signal which carries three sets of 8-bit data (24 bits in total) respectively representing R, G and B, and that the image attribute signal 1b is a digital signal carrying a 1-bit datum with a value of "1" (which provides the instruction to expand the luminance range) or "0" (which provides no instruction to expand the luminance range).

The color conversion means 21 is the same as that of the first embodiment described above, and has a configuration such as shown in FIG. 6. The color conversion means 21 outputs the result of color conversion as a color-converted image data digital signal 2a.

In the D/A conversion means 24, each of the three sets of data respectively representing R, G and B in the color-converted image data digital signal 2a is converted with an 8-bit precision from digital to analog form, and the resultant signal is output as an image data analog signal 7a. In the present embodiment, the maximum output level of the D/A conversion means 24 is set to 1 V. Thus, when the value of the color-converted image data digital signal 2a is 255, the maximum output voltage, i.e., 1 V, is output as the image data analog signal 7a.

The amplifying means 71 receives the image data analog signal 7a and the image attribute signal 1b, and amplifies the image data analog signal 7a, and then outputs the resultant signal as the display data analog signal 1c. The amplification factor can be controlled by the value of the image attribute signal 1b. For example, when the image attribute signal 1b has a value of "1" (which provides the instruction to expand the luminance range), the image data analog signal 7a is amplified by a factor of 2. When the image attribute signal 1b has a value of "0" (which provides no instruction to expand the luminance range), the image data analog signal 7a is not amplified. By controlling the amplifying means 71 in this manner, the luminance range of the image data can be expanded only when the image attribute signal 1b has a value of "1".

As described above, after all the image data have been subjected to color conversion and D/A conversion, the luminance range of only the image data that require expansion of the luminance range is expanded by amplification of the signal level in the amplifying means 71. Through this adjustment of luminance, the entire display image on the screen can be made easier to see.

Furthermore, in the present embodiment, the expansion of the luminance range is carried out with the signal kept in analog form, thereby making it possible to prevent the occurrence of a quantizing error which is inevitable when the expansion of the luminance range is carried out with the signal kept in digital form as in the case of the first and second embodiments.

(Fifth Embodiment)

In all the embodiments described above, the image data stored in the video memory are subjected to luminance conversion at the time when the image is displayed on the screen. In contrast, there are also provided embodiments in which the luminance conversion is not performed at the time when the image is displayed on the screen, but is performed at the time when the image data are stored in the video memory, so that the image data output from the video memory are displayed on the screen without any change in the luminance thereof. Such an embodiment will be described below.

Figure 15:
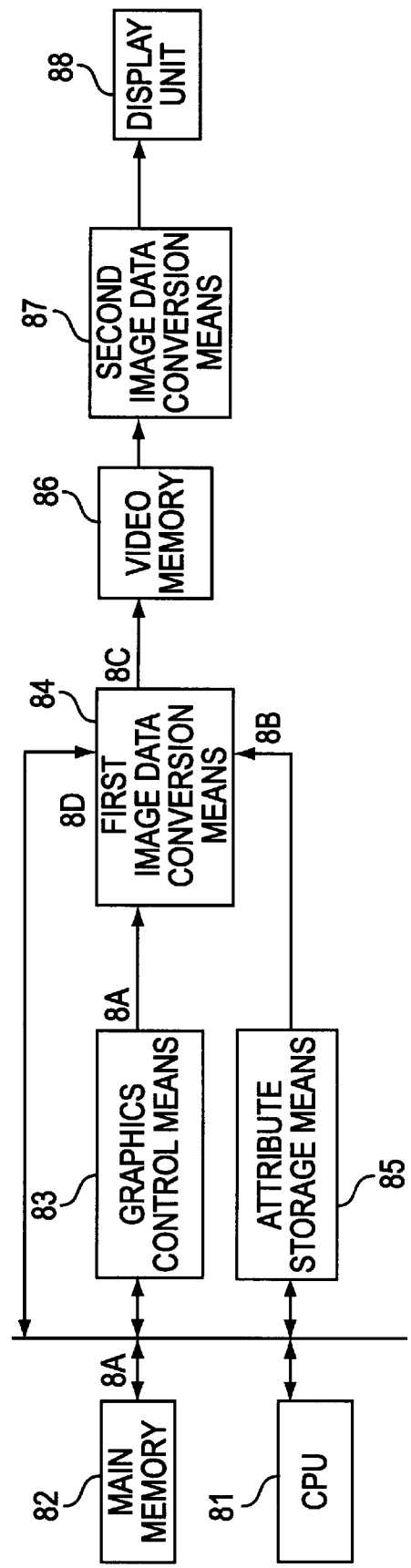
FIG. 15 is a diagram showing the system configuration of multi-window apparatuses according to fifth and sixth embodiments of the present invention.

FIG. 15 shows the system configuration of a multi-window apparatus according to the present embodiment.

In FIG. 15, the reference numeral 81 denotes a central processing unit, 82 a main memory, 83 a graphics control means, 84 a first image data conversion means, 85 an attribute storage means, 86 a video memory, 87 a second image data conversion means, and 88 a display unit, the components denoted by 81 to 87 constituting an image combining means.

The central processing unit 81 executes a program stored in the main memory 82, thereby giving instructions to the graphics control means 83 for the input to or output from the video memory 86, setting the details of the conversion to be carried out by the first image data conversion means 84, setting the data to be stored in the attribute storage means 85, or controlling the output of an image attribute signal 8b from the attribute storage means 85.

The main memory 82 stores not only programs but also image data to be displayed. The stored image data are digital data composed of three sets of 8-bit data (24 bits in total) respectively representing R, G and B. On receiving instructions from the central processing unit 81, the graphics control means 83 executes reading of image data from the main memory 82, writing of the image data into the video memory 86, and output of the image data from the video memory 86.

In the attribute storage means 85, information on whether or not the areas of the image data stored in the main memory 82 require expansion of the luminance range are stored as image attributes corresponding to these areas. The attribute storage means 85 outputs an image attribute corresponding to image data output from the main memory 82.

The first image data conversion means 84 receives a non-luminance-adjusted image data digital signal 8a output from the main memory 82 and also receives the image attribute signal 8b output from the attribute storage means 85, and then outputs a luminance-adjusted image data digital signal 8c to the video memory 86.

In the present embodiment, it is assumed that the video memory 86 can store image data composed of three sets of 9-bit data respectively representing R, G and B. An image data digital signal is output from the video memory 86.

In the second image data conversion means 87, the image data digital signal output from the video memory 86 is converted with a 9-bit precision from digital to analog form, and the resultant signal is output as a display data analog signal. The display unit 88 allows the image to be displayed on its monitor screen in accordance with the display data analog signal output from the second image data conversion means 87.

Figure 16:
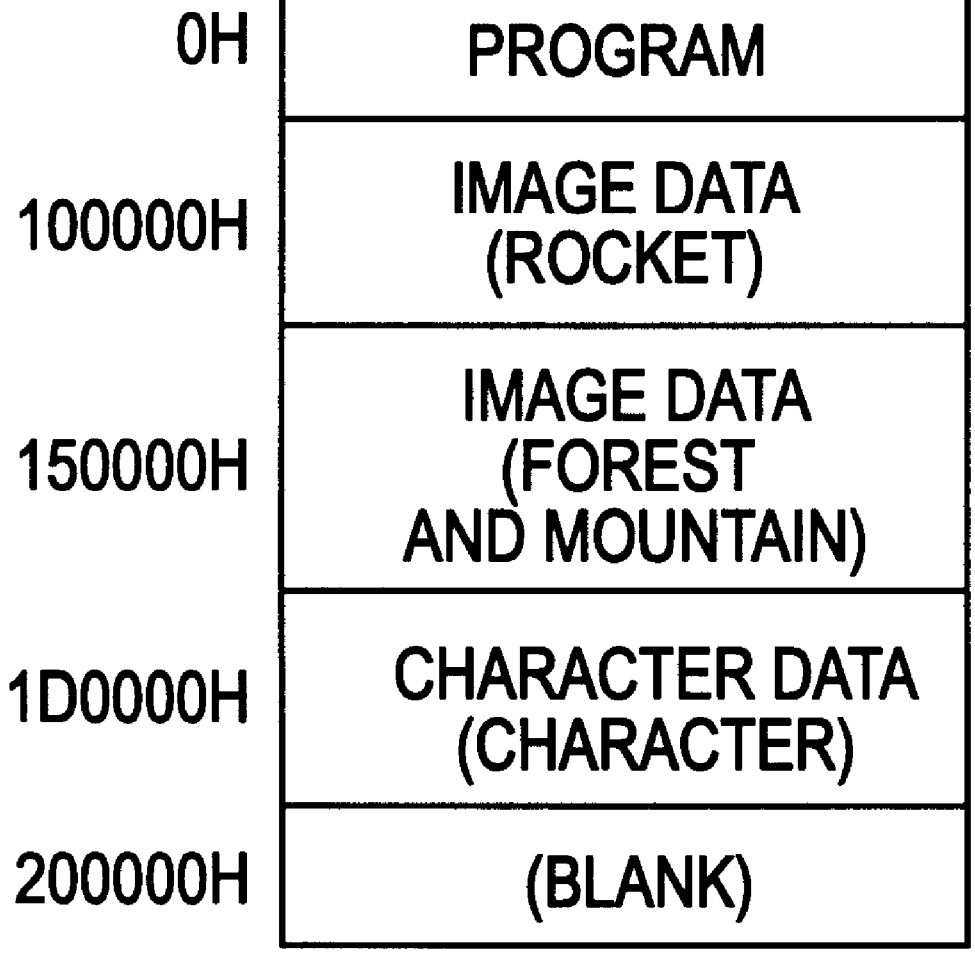
FIG. 16 is a diagram showing the address space of a main memory used in the multi-window apparatuses according to the fifth and sixth embodiments of the present invention.

It is herein assumed that image data representing a character image, a still image of a landscape and a motion image of a rocket such as shown in FIG. 3 are stored in the main memory 82 at such addresses as shown in FIG. 16. The image data are output as the non-luminance-adjusted image data digital signal 8*a* when the central processing unit 81 gives an instruction to the graphics control means 83 for the output of the image data from the main memory 82.

In this case, in the attribute storage means 85, "1" is stored as the image attributes corresponding to the above-mentioned still and motion images, while "0" is stored as the image attributes corresponding to the other images. Among these stored image attributes, the image attribute corresponding to the image data which is currently being output from the main memory 82 is output as the image attribute signal 8*b*.

When the input image attribute signal 8*b* has a value of "1" (which provides the instruction to expand the luminance range), the first image data conversion means 84 expands the luminance range of the image data in the input non-luminance-adjusted image data digital signal 8*a*, thereby generating and outputting the luminance-adjusted image data digital signal 8*c*. When the input image attribute signal 8*b* has a value of "0" (which provides no instruction to expand the luminance range), the first image data conversion means 84 generates and outputs the luminance-adjusted image data digital signal 8*c* without expanding the luminance range of the image data in the input non-luminance-adjusted image data digital signal 8*a*. The video memory 86 receives and stores the luminance-adjusted image data digital signal 8*c*.

In this manner, the luminance ranges of the still and motion images are expanded, so that more realistic display images with higher contrast are obtained. Furthermore, a CG image such as a character image is displayed without any expansion of its luminance range, so that the resultant display image is not too bright and is easy to see as in the case of the conventional multi-window apparatus.

Next, the first image data conversion means will be described in more detail.

Figure 17:
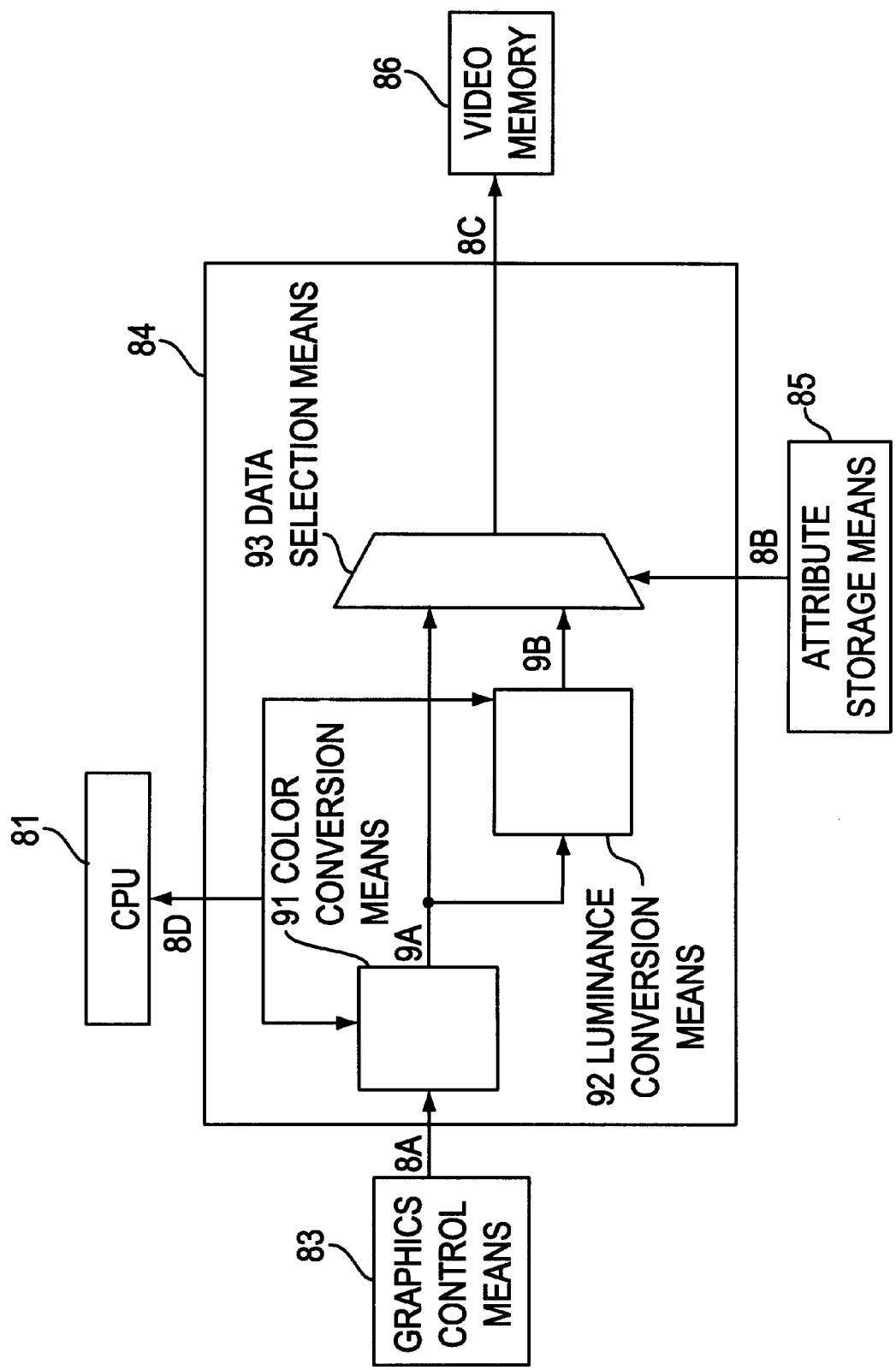
FIG. 17 is a diagram showing the configuration of a first image data conversion means according to the fifth embodiment of the present invention.

FIG. 17 shows the configuration of the first image data conversion means 84 according to the present embodiment. In FIG. 17, the reference numeral 91 denotes a color conversion means, 92 a luminance conversion means, and 93 a data selection means.

It is herein assumed that the non-luminance-adjusted image data digital signal 8*a* is a digital signal which carries three sets of 8-bit data respectively representing R, G and B, and that the image attribute signal 8*b* is a digital signal carrying a 1-bit datum with a value of "1" (which provides the instruction to expand the luminance range) or "0" (which provides no instruction to expand the luminance range).

The color conversion means 91 has a color-correspondence table for each of the colors R, G and B, containing data on the color conversion of each color, as in the case of the color conversion means 21 of FIG. 6. Each of the color-correspondence tables has 256 (=$2^8$) entries. In each entry, color data (8 bits) to be obtained after color conversion is set. The color conversion is carried out as follows: In accordance with the value of the input non-luminance-adjusted image data digital signal 8*a*, an entry is selected from each of the three color-correspondence tables. The three sets of color data which are respectively set in the thus selected entries are read out and combined, and accordingly the combined data is output as a color-converted image data digital signal 9*a*. The color data in the entries of the color-correspondence tables can be arbitrarily set in accordance with a table-update signal 8*d* sent from the central processing unit 81; for example, the color data can be set so that gamma correction (by which the color of the entire image is corrected in accordance with the characteristics of the display unit), conversion of the color tone, or the like, will be carried out.

The luminance conversion means 92 has a luminance-correspondence table for each of the colors R, G and B, containing data on the luminance conversion of each color, as in the case of the luminance conversion means 22 shown in FIG. 7. Each of the luminance-correspondence tables has 256 entries. In each entry, color data (9 bits) to be obtained after luminance conversion is set. The color data in the entries of the luminance-correspondence tables can be arbitrarily set in accordance with a table-update signal 8*d* from the central processing unit 81.

The luminance conversion is carried out as follows: In accordance with the value of the input color-converted image data digital signal 9*a*, an entry is selected from each of the three luminance-correspondence tables. Then, the three sets of color data which are respectively set in the thus selected entries are read out and combined, and accordingly the combined data is output as a luminance-converted image data digital signal 9*b*. Through this luminance conversion, the color-converted image data digital signal 9*a* which carries three sets of 8-bit data respectively representing R, G and B is converted into the luminance-converted image data digital signal 9*b* which carries three sets of 9-bit data respectively representing R, G and B, so that the luminance range can be expanded by a maximum factor of 2.

The data selection means 93 receives the color-converted image data digital signal 9*a*, the luminance-converted image data digital signal 9*b* and the image attribute signal 8*b*. When the value of the image attribute signal 8*b* is "1" (which provides the instruction to expand the luminance range), the data selection means 93 selects and outputs the luminance-converted image data digital signal 9*b*. On the other hand, when the value of the image attribute signal 8*b* is "0" (which provides no instruction to expand the luminance range), the data selection means 93 selects and outputs the color-converted image data digital signal 9*a*. When the color-converted image data digital signal 9*a* is selected, one bit with a value of "0" is added, as the most significant bit, to each of the three sets of 8-bit data respectively representing R, G and B, so that the resultant signal, which carries three sets of 9-bit data respectively representing R, G and B, is output.

The signal output from the data selection means 93 is input as the luminance-adjusted image data digital signal 8*c* to the video memory 86.

As described above, in the first image data conversion means 84 of the present embodiment, the luminance ranges of only the images that require the expansion of their luminance ranges can be expanded by a maximum factor of 2. Furthermore, neither the number of bits constituting the color data to be set in each entry of the luminance-correspondence tables of the luminance conversion means 92, nor the number of bits constituting the image data to be stored in the video memory 86, is limited to 9, so that the rate of expansion of the luminance range can be set freely as required.

Figure 18:
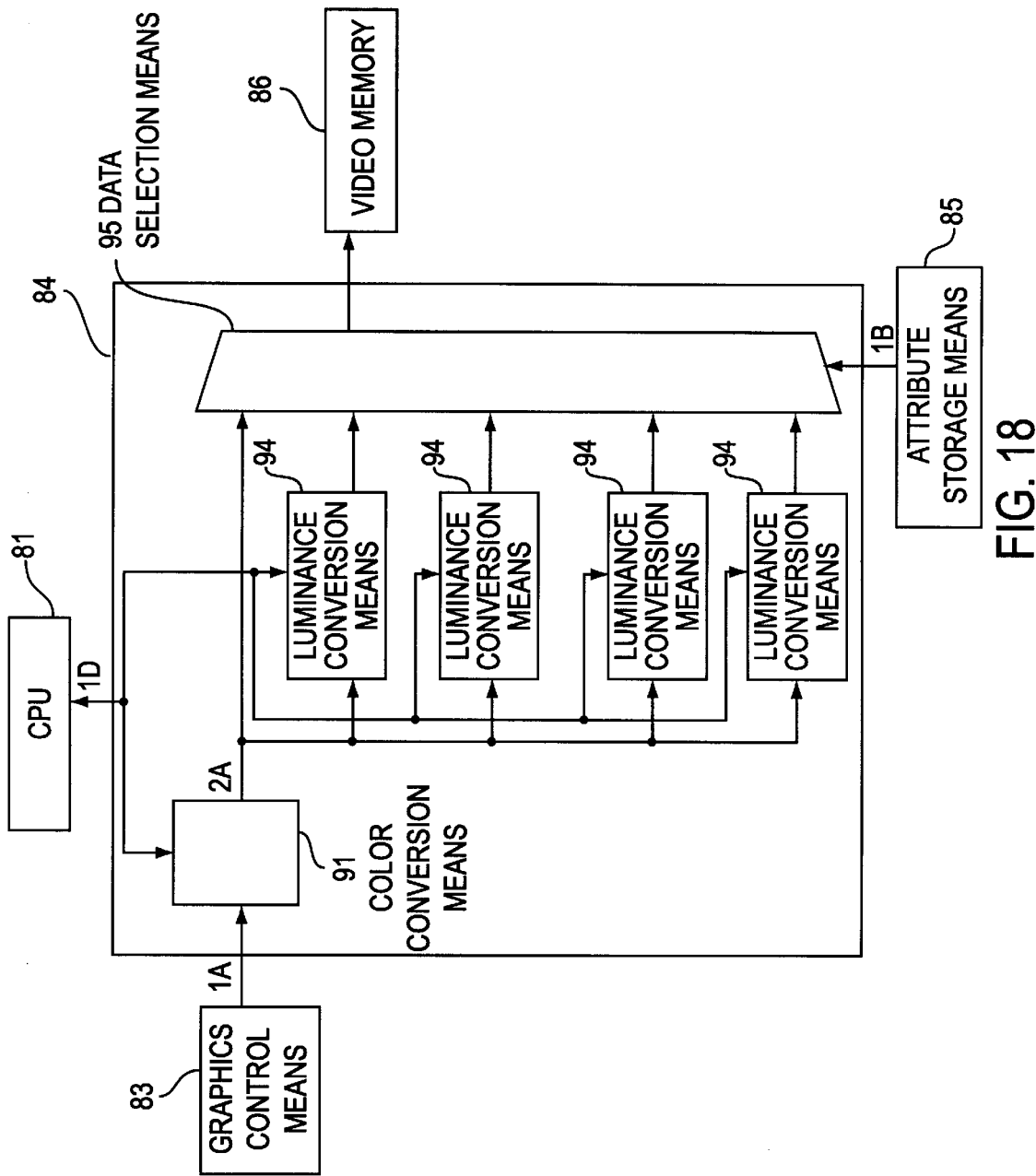
FIG. 18 is a diagram showing the configuration of a first image data conversion means according to the fifth embodiment of the present invention, which includes a plurality of luminance conversion means.

In the present embodiment, only the information on whether the expansion of the luminance range is required or not is stored as the image attribute. In another embodiment, however, the rates of expansion of the luminance range which are required by the respective areas of the image data in the main memory are also stored as the image attributes, so that the luminance range of the image is expanded by using these two or more different rates of expansion. FIG. 18 shows a first image data conversion means 84 according to such an embodiment, which has a plurality of luminance conversion means 94 using different rates of expansion of the luminance range. In the first image data conversion means 84 of FIG. 17, one signal is selected from among the color-converted image data digital signal 9a and a plurality of signals output from these luminance conversion means 94, in accordance with the image attribute signal 8b, and then the selected signal is output.

Figure 19:
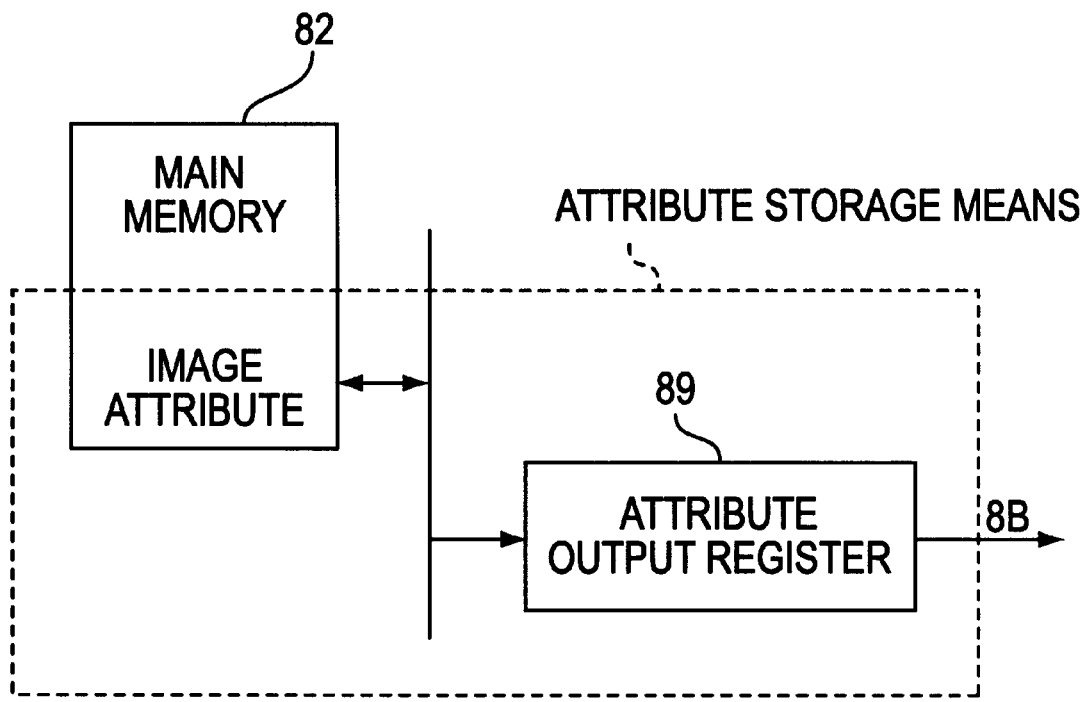
FIG. 19 is a diagram showing the configuration of attribute storage means of the multi-window apparatuses according to the fifth and sixth embodiments of the present invention.

The above-described attribute storage means 85 and main memory 82 of the present embodiment are separate components, but they can also be so arranged that image attributes are stored within the main memory 82. In this case, an attribute storage means 85 shown in FIG. 19 is used. The attribute storage means 85 of FIG. 19 is composed of part of a main memory 82 and an attribute output register 89. When image data is output from the main memory 82 to the first image data conversion means 84, the image attribute corresponding to the thus output image data is set in the attribute output register 89, and is accordingly output therefrom as the image attribute signal 8b to the first image data conversion means 84.

(Sixth Embodiment)

The following describes an embodiment using a first image data conversion means which has a configuration different from that of the first image data conversion means of the fifth embodiment. The system configuration and operation of a multi-window apparatus of the present embodiment are the same as those of the multi-window apparatus of the fifth embodiment described above.

Figure 20:
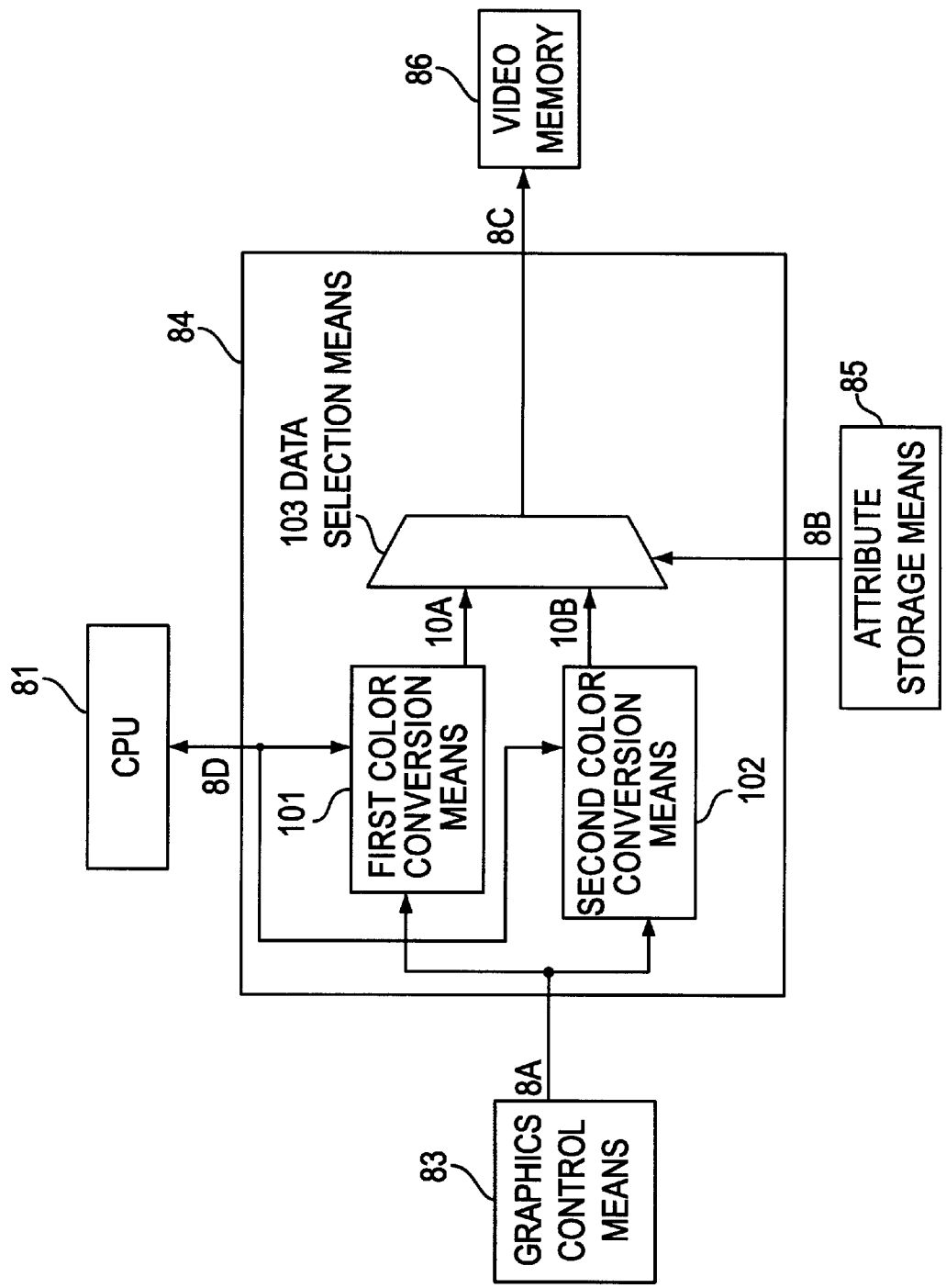
FIG. 20 is a diagram showing the configuration of a first image data conversion means according to the sixth embodiment of the present invention.
Figure 21:
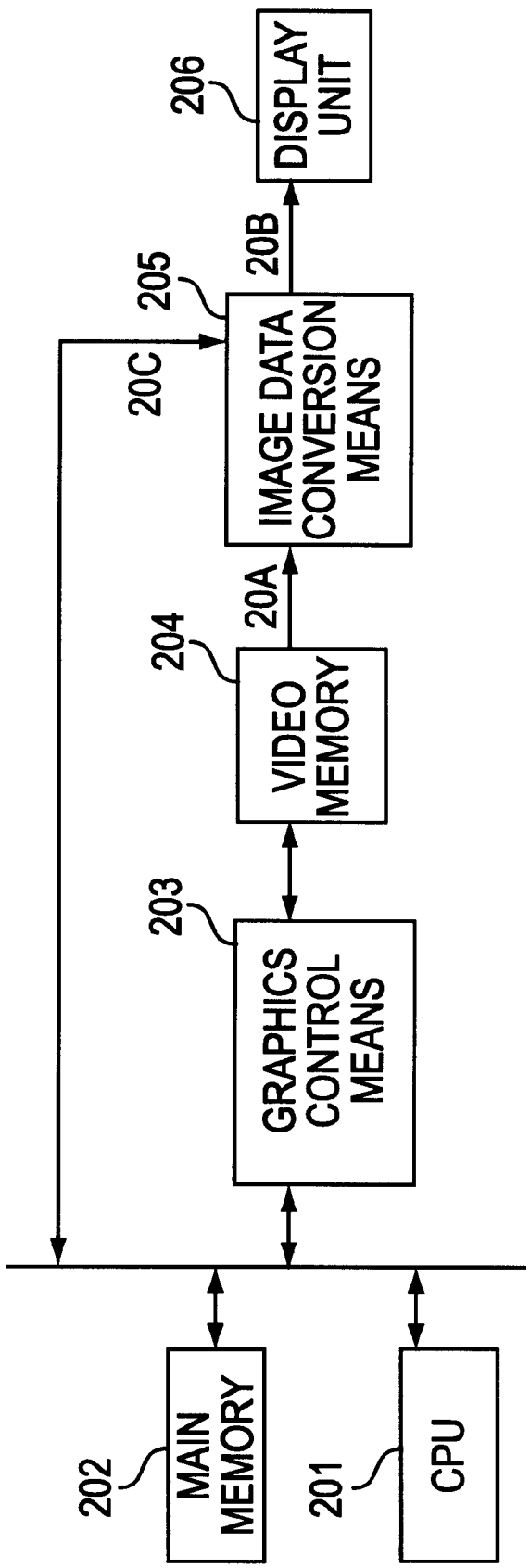
FIG. 21 is a diagram showing the system configuration of a conventional multi-window apparatus.
Figure 22:
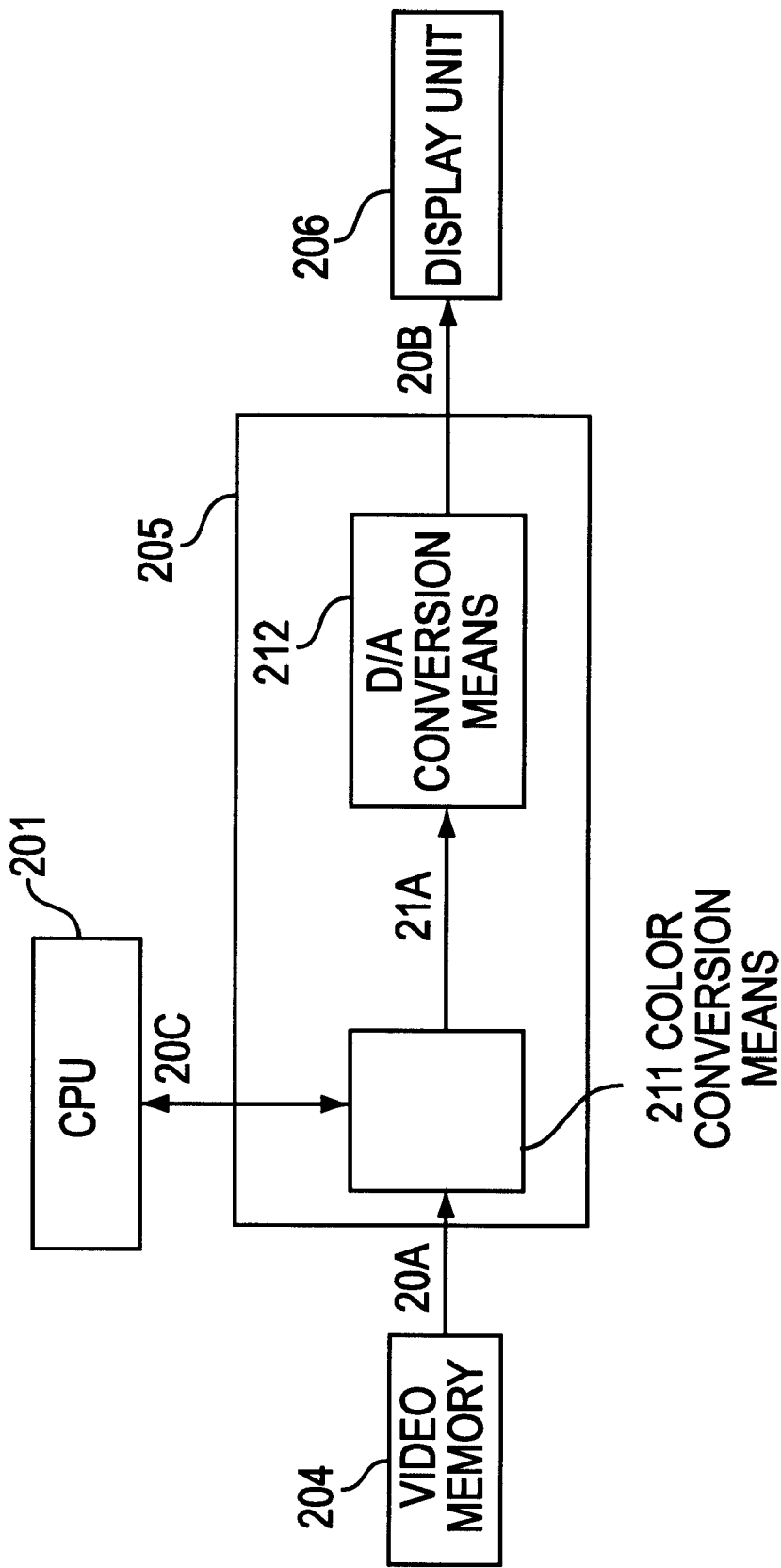
FIG. 22 is a diagram showing the configuration of a conventional image data conversion means.
Figure 23:
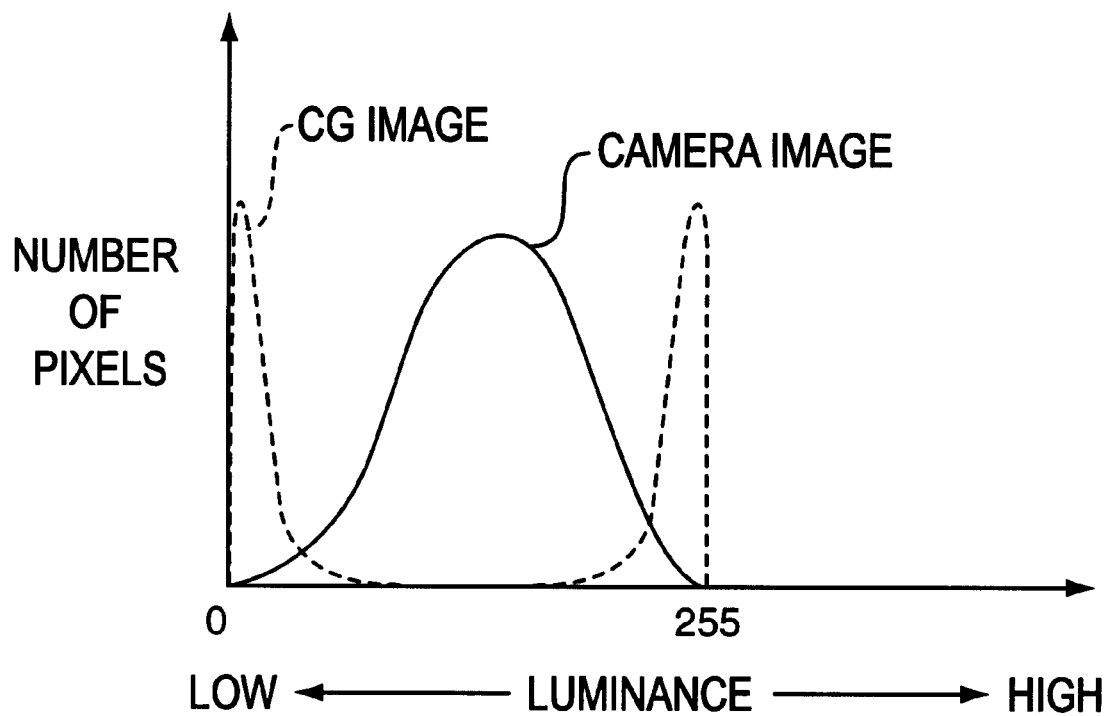
FIG. 23 is a graph showing the pixel distribution with respect to luminance in each set of image data in the prior art.

FIG. 20 shows the configuration of the first image data conversion means 84 according to the present embodiment. In FIG. 20, the reference numeral 101 denotes a first color conversion means, 102 a second color conversion means, and 103 a data selection means.

In the present embodiment, the non-luminance-adjusted image data digital signal 8a output from the main memory 82 which stores the images shown in FIG. 3 is assumed to be a digital signal which carries three sets of 8-bit data (24 bits in total) respectively representing R, G and B, in cases where the still image of the landscape and the motion image of the rocket are output. On the other hand, in cases where the character image and the images corresponding to the other areas of the display screen are output, the non-luminance-adjusted image data digital signal 8a output from the main memory 82 is assumed to be a digital signal which carries 8 bits of data representing a color and 16 bits of dummy data (24 bits in total). The former signal is referred to as a full color signal, while the latter is referred to as a pseudo color signal. It is assumed that the image attribute signal 8b is a digital signal carrying a 1-bit datum with a value of "1" (which provides the instruction to expand the luminance range) or "0" (which provides no instruction to expand the luminance range).

The first color conversion means 101 has a color-correspondence table for each of the colors R, G and B, containing data on the color conversion of each color, as in the case of the first color conversion means 41 of the second embodiment shown in FIG. 10. Each of the color-correspondence tables has 256 entries. In each entry, color data (8 bits) to be obtained after color conversion is set in accordance with a table-update signal 8d sent from the central processing unit 81. The color conversion is carried out as follows: In accordance with the 8 bits of data representing a color in the input non-luminance-adjusted image data digital signal 8a, an entry is selected from each of the three color-correspondence tables. Then, the three sets of color data which are respectively set in the thus selected entries are read out and combined, and accordingly the combined data is output as a first color-converted image data digital signal 10a. The first color conversion means 101 can carry out conversion of a pseudo color signal into a full color signal, as well as the color conversion.

The second color conversion means 102 has a color-correspondence table for each of the colors R, G and B, containing data on the color conversion of each color, as in the case of the second color conversion means 42 of the second embodiment shown in FIG. 11. Each of the color-correspondence tables has 256 entries. In each entry, color data (9 bits) to be obtained after color conversion is set in accordance with a table-update signal 8d sent from the central processing unit 81. The color conversion is carried out as follows: In accordance with the value of the input non-luminance-adjusted image data digital signal 8a, an entry is selected from each of the three color-correspondence tables. Then, the three sets of color data which are respectively set in the thus selected entries are read out and combined, and accordingly, the combined data is output as a second color-converted image data digital signal 10b. In the second color conversion means 102, a full color signal which carries three sets of 8-bit data respectively representing R, G and B is converted into a second color-converted image data digital signal 10b which carries three sets of 9-bit data respectively representing R, G and B. Through this operation, the second color conversion means 102 can carry out the color conversion and can also expand the luminance range by a maximum factor of 2.

The data selection means 103 receives the first color-converted image data digital signal 10a, the second color-converted image data digital signal 10b and the image attribute signal 8b. When the image attribute signal 8b has a value of "1" (which provides the instruction to expand the luminance range), the data selection means 103 selects and outputs the second color-converted image data digital signal 10b. On the other hand, when the image attribute signal 1b has a value of "0" (which provides no instruction to expand the luminance range), the data selection means 103 selects and outputs the first color-converted image data digital signal 10a. When the first color-converted image data digital signal 10a is selected, one bit with a value of "0" is added, as the most significant bit, to each of the three sets of 8-bit data respectively representing R, G and B, so that the resultant signal, which carries three sets of 9-bit data respectively representing R, G and B, is output.

The signal output from the data selection means 103 is input as the luminance-adjusted image data digital signal 8c to the video memory 86.

As described above, an image which requires the expansion of its luminance range and an image which does not require the expansion of its luminance range can be separately subjected to color conversion. This makes it possible to perform luminance adjustment by which the entire display image on the screen can be made easier to see.

Although the character image is represented by the pseudo color signal in the present embodiment, it can also be represented by a full color signal as in the case of the camera images.

In all the above-described six embodiments, the tables are used in the color conversion means and the luminance conversion means. According to the present invention, however, the color and luminance conversion means are not limited to those using such tables; they can also be constituted by other systems such as those using multipliers. Also in the above-described embodiments, the memory is used as the attribute storage means. According to the present invention, however, the attribute storage means is not limited to that using a memory; it can also be constituted by other systems such as those using registers for storing the coordinates of the areas of an image and for storing image attributes.

I claim:

1. An image data conversion apparatus which receives an image data digital signal output from a video memory having a plurality of storage areas where a plurality of image data are respectively stored, and also receives an image attribute signal output from an attribute storage means where information on whether expansion of a luminance range is required or not is stored as an image attribute corresponding to each of said storage areas, said image attribute signal providing an instruction to expand the luminance range when said image attribute indicates that the expansion of the luminance range is required, or providing no instruction to expand the luminance range when said image attribute indicates that the expansion of the luminance range is not required, said image data conversion apparatus then generating a display data analog signal which allows a display unit to display an image, and thereafter outputting the thus generated signal to the display unit, wherein a luminance value represented by said display data analog signal is increased only when the received image attribute signal provides the instruction to expand the luminance range.

2. The image data conversion apparatus of claim 1, comprising:

a luminance conversion means which performs luminance conversion on said image data digital signal input thereto so as to expand the luminance range, and outputs the result of the conversion as a luminance-converted image data digital signal;

a data selection means which receives said image data digital signal, said luminance-converted image data digital signal and said image attribute signal, and selects said luminance-converted image data digital signal when said image attribute signal provides the instruction to expand the luminance range, or selects said image data digital signal when said image attribute signal provides no instruction to expand the luminance range, and then outputs the thus selected signal; and a D/A conversion means which converts, from digital to analog form, the image data digital signal or luminance-converted image data digital signal output from said data selection means, and outputs the result of the conversion as said display data analog signal.

3. The image data conversion apparatus of claim 1, comprising:

a first color conversion means which performs color conversion on said image data digital signal input thereto, and outputs the result of the conversion as a first color-converted image data digital signal;

a second color conversion means which performs color conversion on said image data digital signal input thereto and also performs luminance conversion on it so as to expand the luminance range, and then outputs the results of the conversion as a second color-converted image data digital signal;

a data selection means which receives said first color-converted image data digital signal, said second color-converted image data digital signal and said image attribute signal, and selects said second color-converted image data digital signal when said image attribute signal provides the instruction to expand the luminance range, or selects said first color-converted image data digital signal when said image attribute signal provides no instruction to expand the luminance range, and then outputs the thus selected signal; and a D/A conversion means which converts, from digital to analog form, the first or second color-converted image data digital signal output from said data selection means, and outputs the result of the conversion as said display data analog signal.

4. The image data conversion apparatus of claim 1, comprising:

first D/A conversion means which converts said image data digital signal input thereto from digital to analog form, and outputs the result of the conversion as a first image data analog signal;

second D/A conversion means which converts said image data digital signal input thereto from digital to analog form at a higher maximum output signal level as compared with said first D/A conversion means, and outputs the result of the conversion as a second image data analog signal; and a data selection means which receives said first image data analog signal, said second image data analog signal and said image attribute signal, and selects said second image data analog signal when said image attribute signal provides the instruction to expand the luminance range, or selects said first image data analog signal when said image attribute signal provides no instruction to expand the luminance range, and then outputs the thus selected signal as said display data analog signal.

5. The image data conversion apparatus of claim 1, comprising:

a D/A conversion means which converts said image data digital signal input thereto from digital to analog form, and outputs the result of the conversion as an image data analog signal; and an amplifying means which receives said image data analog signal and said image attribute signal, and amplifies the received image data analog signal by a relatively high amplification factor when said image attribute signal provides the instruction to expand the luminance range, or amplifies the received image data analog signal by a relatively low amplification factor when said image attribute signal provides no instruction to expand the luminance range, and then outputs the result of the amplification as said display data analog signal.

6. An image data conversion apparatus which receives an image data digital signal output from a video memory having a plurality of storage areas where a plurality of image data are respectively stored, and also receives an image attribute signal output from an attribute storage means where a rate of expansion of a luminance range as well as information on whether the expansion of the luminance range is required or not is stored as an image attribute corresponding to each of said storage areas, said image attribute signal providing an instruction to expand the luminance range and also indicating the rate of expansion of the luminance range when said image attribute indicates that the expansion of the luminance range is required, or providing no instruction to expand the luminance range when said image attribute indicates that the expansion of the luminance range is not required, said image data conversion apparatus then generating a display data analog signal which allows a display unit to display an image, and thereafter outputting the thus generated signal to the display unit, wherein a luminance value represented by said display data analog signal is increased in accordance with the received image attribute signal only when the image attribute signal provides the instruction to expand the luminance range.

7. The image data conversion apparatus of claim 6, comprising:

a plurality of luminance conversion means which perform luminance conversion on said image data digital signal input thereto so as to expand the luminance range, and output their respective results of the conversion as luminance-converted image data digital signals;

a data selection means which receives said image data digital signal, said luminance-converted image data digital signals and said image attribute signal, and selects one digital signal from among said image data digital signal and said luminance-converted image data digital signals in accordance with said image attribute signal; and a D/A conversion means which converts, from digital to analog form, the digital signal selected by said data selection means, and outputs the result of the conversion as said display data analog signal.

8. The image data conversion apparatus of claim 6, comprising:

a plurality of D/A conversion means which convert said image data digital signal input thereto from digital to analog form at different maximum output signal levels, and output their respective results of the conversion as image data analog signals; and a data selection means which receives said image data analog signals and said image attribute signal, and selects one analog signal from among said image data analog signals in accordance with said image attribute signal, and then outputs the thus selected analog signal as said display data analog signal.

9. An image data conversion apparatus which receives a non-luminance-adjusted image data digital signal output from a main memory having a plurality of storage areas where a plurality of image data are respectively stored, and also receives an image attribute signal output from an attribute storage means where information on whether expansion of a luminance range is required or not is stored as an image attribute corresponding to each of said storage areas, said image attribute signal providing an instruction to expand the luminance range when said image attribute indicates that the expansion of the luminance range is required, or providing no instruction to expand the luminance range when said image attribute indicates that the expansion of the luminance range is not required, said image data conversion apparatus then generating a luminance-adjusted image data digital signal and outputting it to a video memory, wherein a luminance value represented by said luminance-adjusted image data digital signal is increased only when the received image attribute signal provides the instruction to expand the luminance range.

10. The image data conversion apparatus of claim 9, comprising:

a luminance conversion means which performs luminance conversion on said non-luminance-adjusted image data digital signal input thereto so as to expand the luminance range, and outputs the result of the conversion as a luminance-converted image data digital signal; and a data selection means which receives said non-luminance-adjusted image data digital signal, said luminance-converted image data digital signal and said image attribute signal, and selects said luminance-converted image data digital signal when said image attribute signal provides the instruction to expand the luminance range, or selects said non-luminance-adjusted image data digital signal when said image attribute signal provides no instruction to expand the luminance range, and then outputs the thus selected signal as said luminance-adjusted image data digital signal.

11. The image data conversion apparatus of claim 9, comprising:

a first color conversion means which performs color conversion on said non-luminance-adjusted image data digital signal input thereto, and outputs the result of the conversion as a first color-converted image data digital signal;

a second color conversion means which performs color conversion on said non-luminance-adjusted image data digital signal input thereto and also performs luminance conversion on it so as to expand the luminance range, and then outputs the results of the conversion as a second color-converted image data digital signal; and a data selection means which receives said first colorconverted image data digital signal, said second color-converted image data digital signal and said image attribute signal, and selects said second color-converted image data digital signal when said image attribute signal provides the instruction to expand the luminance range, or selects said first color-converted image data digital signal when said image attribute signal provides no instruction to expand the luminance range, and then outputs the thus selected signal as said luminance-adjusted image data digital signal.

12. An image data conversion apparatus which receives a non-luminance-adjusted image data digital signal output from a main memory having a plurality of storage areas where a plurality of image data are respectively stored, and also receives an image attribute signal output from an attribute storage means where a rate of expansion of a luminance range as well as information on whether the expansion of the luminance range is required or not is stored as an image attribute corresponding to each of said storage areas, said image attribute signal providing an instruction to expand the luminance range and also indicating the rate of expansion of the luminance range when said image attribute indicates that the expansion of the luminance range is required, or providing no instruction to expand the luminance range when said image attribute indicates that the expansion of the luminance range is not required, said image data conversion apparatus then generating a luminance-adjusted image data digital signal and outputting it to a video memory, wherein a luminance value represented by said luminance-adjusted image data digital signal is increased in accordance with the received image attribute signal only when the image attribute signal provides the instruction to expand the luminance range.

13. The image data conversion apparatus of claim 12, comprising:

a plurality of luminance conversion means which perform luminance conversion on the non-luminance-adjusted image data digital signal input thereto so as to expand the luminance range, and output their respective results of the conversion as luminance-converted image data digital signals; and a data selection means which receives said non-luminance-adjusted image data digital signal, said luminance-converted image data digital signals and said image attribute signal, and selects one digital signal from among said non-luminance-adjusted image data digital signal and said luminance-converted image data digital signals in accordance with said image attribute signal, and then outputs the thus selected digital signal as said luminance-adjusted image data digital signal.

14. A multi-widow apparatus comprising:

an image combining means for combining a plurality if images; and a display unit for displaying, on a screen, an image that is obtained by combining said plurality of images by said image combining means, wherein said image combining means distinguishes a first image from a second image, said first image requiring a relative expansion of its luminance range with respect to said second image, converts luminance ranges of at least one of said first and second images so that an upper limit of the luminance range of said first image exceeds an upper limit of the luminance range of said second image, and then combines said first and second images.

15. The multi-window apparatus of claim 14, wherein said image combining means expands the luminance range of only said first image, and then combines said first and second images.

16. The multi-window apparatus of claim 15, wherein said image combining means comprises:

a video memory which has a plurality of storage areas for respectively storing a plurality of image data, and outputs, as an image data digital signal, the image data stored in the respective storage areas;

an attribute storage means for storing, as an image attribute corresponding to each of said storage areas, information on whether expansion of a luminance range is required or not, and for outputting an image attribute signal which provides an instruction to expand the luminance range when said image attribute indicates that the expansion of the luminance range when said image attribute indicates that the expansion of the luminance range is not required; and an image data conversion means which receives the image data digital signal output from said video memory and the image attribute signal output from said attribute storage means, and generates a display data analog signal for allowing said display unit to display the image, and then outputs the thus generated signal to the display unit, said image data conversion means increasing a luminance value represented by said display data analog signal only when said image attribute signal provides the instruction to expand the luminance range.

17. The multi-window apparatus of claim 16, wherein said image data conversion means comprises:

a luminance conversion means which performs luminance conversion on said image data digital signal input thereto so as to expand the luminance range, and outputs the result of the conversion as a luminance-converted image data digital signal;

a data selection means which receives said image data digital signal, said luminance-converted image data digital signal and said image attribute signal, and selects said luminance-converted image data digital signal when said image attribute signal provides the instruction to expand the luminance range, or selects said image data digital signal when said image attribute signal provides no instruction to expand the luminance range, and then outputs the thus selected signal; and a D/A conversion means which converts, from digital to analog form, the image data digital signal or luminance-converted image data digital signal output from said data selection means, and outputs the result of the conversion as said display data analog signal.

18. The multi-window apparatus of claim 14, wherein said second image represents an object by contrast with the background, and wherein said first image has a continuing luminance distribution between one and another peaks in a luminance distribution of said second image.

19. The multi-window apparatus of claim 18, wherein said first image includes photograph or motion video image, and wherein said second image includes character image or computer graphics.

20. The multi-window apparatus of claim 18, wherein said first image is an image produced by using a camera, and wherein said second image is an image produced by a computer.

21. The multi-window apparatus of claim 15, wherein said image combining means comprises:

a main memory which has a plurality of storage areas for respectively storing a plurality of image data, and outputs, as a non-luminance-adjusted image data digital signal, the image data stored in the respective storage areas;

an attribute storage means for storing, as an image attribute corresponding to each of said storage areas, information on whether expansion of a luminance range is required or not, and for outputting an image attribute signal which provides an instruction to expand the luminance range when said image attribute indicates that the expansion of the luminance range is required, or provides no instruction to expand the luminance range when said image attribute indicates that the expansion of the luminance range is not required;

a first image data conversion means which receives the non-luminance-adjusted image data digital signal output from said main memory and the image attribute signal output from said attribute storage means, and outputs a luminance-adjusted image data digital signal, said first image data conversion means increasing a luminance value represented by said luminance-adjusted image data digital signal only when said image attribute signal provides the instruction to expand the luminance range;

a video memory which first stores, in the form of image data, said luminance-adjusted image data digital signal output from said first image data conversion means, and then outputs the stored image data as an image data digital signal; and a second image data conversion means which receives the image data digital signal output from said video memory, and generates and outputs a display data analog signal.

22. The multi-window apparatus of claim 21, wherein said first image data conversion means comprises:

a luminance conversion means which performs luminance conversion on said non-luminance-adjusted image data digital signal input thereto so as to expand the luminance range, and outputs the result of the conversion as a luminance-converted image data digital signal; and a data selection means which receives said non-luminance-adjusted image data digital signal, said luminance-converted image data digital signal and said image attribute signal, and selects said luminance-converted image data digital signal when said image attribute signal provides the instruction to expand the luminance range, or selects said non-luminance-adjusted image data digital signal when said image attribute signal provides no instruction to expand the luminance range, and then outputs the thus selected signal as said luminance-adjusted image data digital signal.

23. The multi-window apparatus of claim 21, wherein said first image data conversion means comprises:

a first color conversion means which performs color conversion on said non-luminance-adjusted image data digital signal input thereto, and outputs the result of the conversion as a first color-converted image data digital signal;

a second color conversion means which performs color conversion on said non-luminance-adjusted image data digital signal input thereto and also performs luminance conversion on it so as to expand the luminance range, and then outputs the results of the conversion as a second color-converted image data digital signal; and a data selection means which receives said first color-converted image data digital signal, said second color-converted image data digital signal and said image attribute signal, and selects said second color-converted image data digital signal when said image attribute signal provides the instruction to expand the luminance range, or selects said first color-converted image data digital signal when said image attribute signal provides no instruction to expand the luminance range, and then outputs the thus selected signal as said luminance-adjusted image data digital signal.

24. The multi-window apparatus of claim 21, wherein said attribute storage means stores, as the image attribute corresponding to each of said storage areas, a rate of expansion of the luminance range as well as the information on whether the expansion of the luminance range is required or not, and outputs an image attribute signal which not only provides the instruction to expand the luminance range but also indicates the rate of expansion of the luminance range when said image attribute indicates that the expansion of the luminance range is required, or provides no instruction to expand the luminance range when said image attribute indicates that the expansion of the luminance range is not required, and said first image data conversion means comprises:

a plurality of luminance conversion means which perform luminance conversion on the non-luminance-adjusted image data digital signal input thereto so as to expand the luminance range, and output their respective results of the conversion as luminance-converted image data digital signals; and a data selection means which receives said non-luminance-adjusted image data digital signal, said luminance-converted image data digital signals and said image attribute signal, and selects one digital signal from among said non-luminance-adjusted image data digital signal and said luminance-converted image data digital signals in accordance with said image attribute signal, and then outputs the thus selected digital signal as said luminance-adjusted image data digital signal.

25. The multi-window apparatus of claim 16, wherein said image data conversion means comprises:

a first color conversion means which performs color conversion on said image data digital signal input thereto, and outputs the result of the conversion as a first color-converted image data digital signal;

a second color conversion means which performs color conversion on said image data digital signal input thereto and also performs luminance conversion on it so as to expand the luminance range, and then outputs the results of the conversion as a second color-converted image data digital signal;

a data selection means which receives said first color-converted image data digital signal, said second color-converted image data digital signal and said image attribute signal, and selects said second color-converted image data digital signal when said image attribute signal provides the instruction to expand the luminance range, or selects said first color-converted image data digital signal when said image attribute signal provides no instruction to expand the luminance range, and then outputs the thus selected signal; and a D/A conversion means which converts, from digital to analog form, the first or second color-converted image data digital signal output from said data selection means, and outputs the result of the conversion as said display data analog signal.

26. The multi-window apparatus of claim 16, wherein said image data conversion means comprises:

a first D/A conversion means which converts said image data digital signal input thereto from digital to analog form, and outputs the result of the conversion as a first image data analog signal;

a second D/A conversion means which converts said image data digital signal input thereto from digital to analog form at a higher maximum output signal level as compared with said first D/A conversion means, and outputs the result of the conversion as a second image data analog signal; and a data selection means which receives said first image data analog signal, said second image data analog signal and said image attribute signal, and selects said second image data analog signal when said image attribute signal provides the instruction to expand the luminance range, or selects said first image data analog signal when said image attribute signal provides no instruction to expand the luminance range, and then outputs the thus selected signal as said display data analog signal.

27. The multi-window apparatus of claim 16, wherein said image data conversion means comprises:

a D/A conversion means which converts said image data digital signal input thereto from digital to analog form, and outputs the result of the conversion as an image data analog signal; and an amplifying means which receives said image data analog signal and said image attribute signal, and amplifies the received image data analog signal by a relatively high amplification factor when said image attribute signal provides the instruction to expand the luminance range, or amplifies the received image data analog signal by a relatively low amplification factor when said image attribute signal provides no instruction to expand the luminance range, and then outputs the result of the amplification as said display data analog signal.

28. The multi-window apparatus of claim 16, wherein said attribute storage means stores, as the image attribute corresponding to each of said storage areas, a rate of expansion of the luminance range as well as the information on whether the expansion of the luminance range is required or not, and outputs an image attribute signal which not only provides the instruction to expand the luminance range but also indicates the rate of expansion of the luminance range when said image attribute indicates that the expansion of the luminance range is required, or provides no instruction to expand the luminance range when said image attribute indicates that the expansion of the luminance range is not required, and said image data conversion means comprises:
   a plurality of luminance conversion means which perform luminance conversion on said image data digital signal input thereto so as to expand the luminance range, and output their respective results of the conversion as luminance-converted image data digital signals;
   a data selection means which receives said image data digital signal, said luminance-converted image data digital signals and said image attribute signal, and selects one digital signal from among said image data digital signal and said luminance-converted image data digital signals in accordance with said image attribute signal; and
   a D/A conversion means which converts, from digital to analog form, the digital signal selected by said data selection means, and outputs the result of the conversion as said display data analog signal.

29. The multi-window apparatus of claim 16, wherein said attribute storage means stores, as the image attribute corresponding to each of said storage areas, a rate of expansion of the luminance range as well as the information on whether the expansion of the luminance range is required or not, and outputs an image attribute signal which not only provides the instruction to expand the luminance range but also indicates the rate of expansion of the luminance range when said image attribute indicates that the expansion of the luminance range is required, or provides no instruction to expand the luminance range when said image attribute indicates that the expansion of the luminance range is not required, and said image data conversion means comprises:
   a plurality of D/A conversion means which convert said image data digital signal input thereto from digital to analog form at different maximum output signal levels, and output their respective results of the conversion as image data analog signals; and
   a data selection means which receives said image data analog signals and said image attribute signal, and selects one analog signal from among said image data analog signals in accordance with said image attribute signal, and then outputs the thus selected analog signal as said display data analog signal.

30. A method of displaying a plurality of images on a screen, comprising the steps of:

combining a plurality of images; and displaying, on said screen, an image that is obtained by combining said plurality of images by said combining step;

wherein said combining step comprises:
   a first step of distinguishing a first image from a second image, said first image requiring a relative expansion of its luminance range with respect to said second image;
   a second step of converting a luminance range of at least one of said first and second images so that an upper limit of the luminance range of said first image exceeds an upper limit of the luminance range of said second image; and
   a third step of combining said first and second images.

31. The method of displaying a plurality of images on a screen according to claim 30, wherein said second step includes the step of expanding the luminance range of only said first image.

32. The method of displaying a plurality of images on a screen according to claim 30, wherein said second image represents an object by contrast with the background, and said first image has a continuing luminance distribution between one and another peaks in a luminance distribution of said second images.

* * * * *